(12) United States Patent
Santoro

(10) Patent No.: US 11,280,453 B2
(45) Date of Patent: Mar. 22, 2022

(54) WEDGE-SHAPED LIGHT GUIDES FOR LUMINARIES AND LUMINAIRE ASSEMBLIES INCORPORATING SAME

(71) Applicant: Lumenpulse Group Inc./Groupe Lumenpulse Inc., Surrey (CA)

(72) Inventor: Scott Santoro, Delta (CA)

(73) Assignee: LMPG Inc., Surrey (CA)

( * ) Notice: Subject to any disclaimer, the term of this patent is extended or adjusted under 35 U.S.C. 154(b) by 0 days.

(21) Appl. No.: 17/263,548

(22) PCT Filed: Sep. 16, 2019

(86) PCT No.: PCT/CA2019/051315
§ 371 (c)(1),
(2) Date: Jan. 27, 2021

(87) PCT Pub. No.: WO2020/056501
PCT Pub. Date: Mar. 26, 2020

(65) Prior Publication Data
US 2021/0247031 A1    Aug. 12, 2021

Related U.S. Application Data

(60) Provisional application No. 62/859,662, filed on Jun. 10, 2019, provisional application No. 62/732,469, filed on Sep. 17, 2018.

(51) Int. Cl.
*F21K 9/61* (2016.01)
*F21V 8/00* (2006.01)

(52) U.S. Cl.
CPC .............. *F21K 9/61* (2016.08); *G02B 6/0048* (2013.01); *G02B 6/0061* (2013.01)

(58) Field of Classification Search
CPC ....... F21K 9/61; G02B 6/0048; G02B 6/0061; G02B 6/10
See application file for complete search history.

(56) References Cited

U.S. PATENT DOCUMENTS

| 6,273,577 B1* | 8/2001 | Goto ................... F21S 19/00 349/65 |
| 10,215,344 B2* | 2/2019 | Santoro ................... F21K 9/61 |
| 2004/0109306 A1* | 6/2004 | Lee ................... G02B 6/002 362/615 |
| 2007/0189701 A1 | 8/2007 | Chakmakjian |

(Continued)

FOREIGN PATENT DOCUMENTS

| EP | 3369985 A1 | 9/2018 |
| WO | 2008065576 A1 | 6/2008 |
| WO | 2011130715 A2 | 10/2011 |

*Primary Examiner* — Zheng Song
(74) *Attorney, Agent, or Firm* — Oyen Wiggs Green & Mutala LLP

(57) ABSTRACT

A light guide is disclosed. The light guide may comprise a wedge shape. The light guide includes a light receiving surface, a light transmission region, a transition region, and a light emission region. Light emission region includes a first major surface and an opposing second major surface. The light emission region may include a plurality of steps disposed along a length of one or both of the major surfaces. The light emission region may also include a plurality of vertically-extending flutes along one or both of the major surfaces. A luminaire assembly incorporating the light guide is also disclosed.

18 Claims, 32 Drawing Sheets

(56) References Cited

U.S. PATENT DOCUMENTS

| | | | | |
|---|---|---|---|---|
| 2008/0285310 A1* | 11/2008 | Aylward | .............. | G02B 6/0068 |
| | | | | 362/626 |
| 2009/0080038 A1* | 3/2009 | Hayashide | ......... | H04N 1/02835 |
| | | | | 358/475 |
| 2014/0140084 A1* | 5/2014 | Zwick | ..................... | B60Q 1/26 |
| | | | | 362/511 |
| 2014/0270672 A1* | 9/2014 | Durkee | ................ | G02B 6/0028 |
| | | | | 385/131 |
| 2017/0082269 A1* | 3/2017 | Castillo | ................... | F21V 13/04 |
| 2017/0089541 A1* | 3/2017 | Nakajima | ................ | B60Q 1/22 |
| 2017/0090103 A1* | 3/2017 | Holman | ................ | G02B 6/003 |
| 2018/0058656 A1* | 3/2018 | Naron | ................... | F21S 43/249 |
| 2018/0306967 A1* | 10/2018 | Fernandez | ............ | F21V 7/0083 |
| 2019/0351814 A1* | 11/2019 | Furubayashi | ........ | G02B 6/0021 |
| 2020/0158309 A1* | 5/2020 | Noh | ........................ | F21S 43/50 |
| 2021/0103086 A1* | 4/2021 | Yamada | .............. | G02B 6/0048 |

* cited by examiner

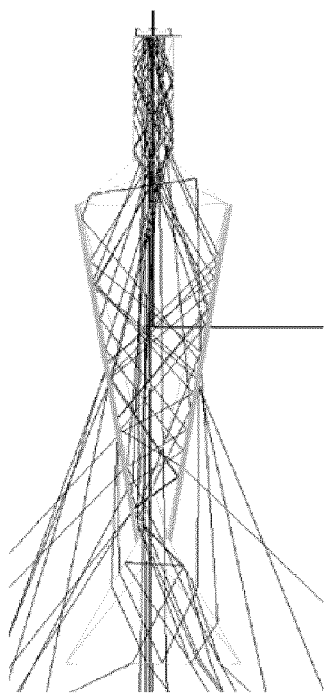 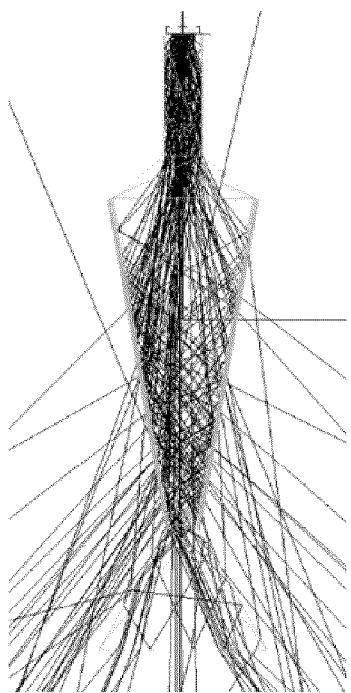 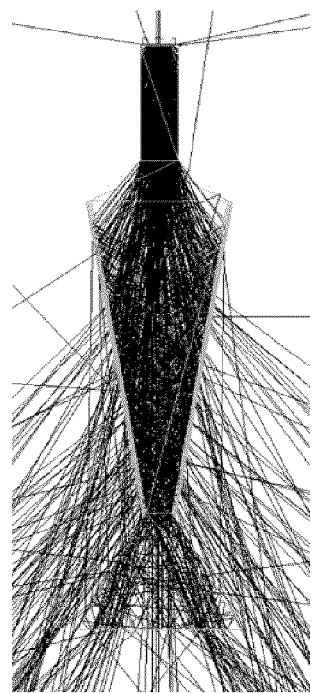
Figure 24A　　　Figure 24B　　　Figure 24C
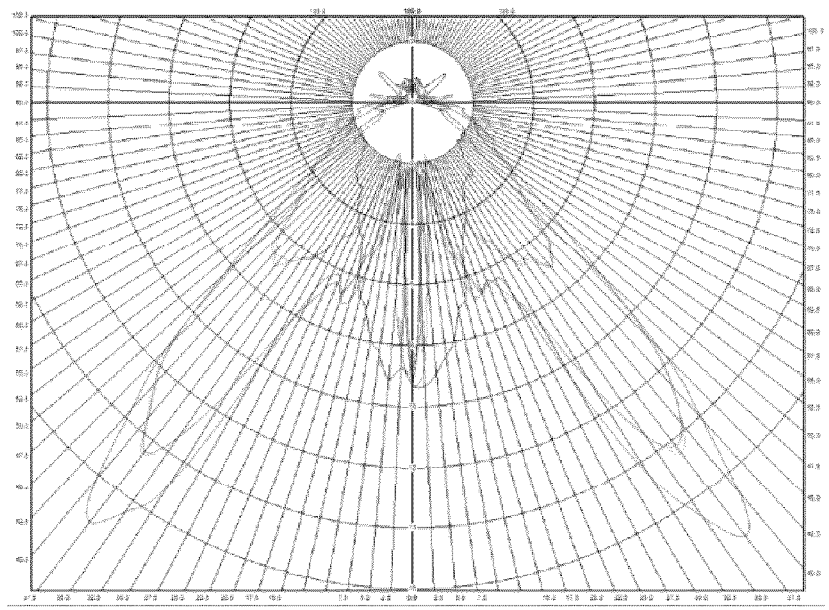
Figure 25

WEDGE-SHAPED LIGHT GUIDES FOR LUMINARIES AND LUMINAIRE ASSEMBLIES INCORPORATING SAME

REFERENCE TO RELATED APPLICATIONS

This application is a national phase entry of Patent Cooperation Treaty Patent application No. PCT/CA2019/051315, which claims priority to and the benefit of U.S. Provisional Patent Application Ser. Nos. 62/732,469 filed 17 Sep. 2018 and 62/859,662 filed 10 Jun. 2019. The foregoing applications are hereby incorporated by reference herein in their entireties for all purposes.

TECHNICAL FIELD

This invention relates to light guides for luminaires and light emitting assemblies.

BACKGROUND

Luminaires can use light guides to transmit light from point light sources such as light emitting diodes (LEDs) to extraction elements where the light is extracted.

One objective in lighting is to provide even illuminance on a work plane, which can be achieved by providing a lighting distribution known in the art as a "batwing" distribution. Another objective in lighting is to eliminate or reduce glare. Glare is an effect of luminance at high vertical angles that can cause visual discomfort to users.

Light guides that provide even illuminance and minimal glare are desirable.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a light guide. The light guide has a light receiving surface, a light transmission region in optical communication with the light receiving surface, and a light emission region in optical communication with the light transmission region. The light receiving surface may be in a substantially horizontal plane. The light emission region may have a wedge-shaped cross section. The light emission region has a first major surface and a second major surface opposite to the first major surface. The first and second major surfaces may taper toward each other to define a distal end. A substantially straight path may be provided between the light receiving surface and the distal end. The distal end may comprise a point or an inverted V-shape.

In some embodiments, the light transmission region and the light emission region are integrally formed. In some embodiments, the light transmission region, the transition region and the light emission region are integrally formed.

In some embodiments, at the distal end of the light guide, a first inner angle is defined by the first major surface relative to an imaginary vertical line, and a second inner angle is defined by the second major surface relative to the imaginary vertical line. Each of the first and second inner angles may range from 2 degrees to 15 degrees. The first and second inner angles may be substantially the same.

In some embodiments, at the distal end, an inner angle is defined between the first major surface and the second major surface. The inner angle may range from 4 degrees to 30 degrees. In some embodiments, the second major surface may be substantially vertical.

In some embodiments, the light guide has a transition region between the light transmission region and the light emission region. The transition region has a first return surface between the first major surface of the light emission region and a first major surface of the light transmission region. In some embodiments, the transition region may be further defined by a second return surface between the second major surface of the light emission region and the second major surface of the light transmission region.

In some embodiments, the light emission region has a maximum thickness that is at least 1.5 times a maximum thickness of the light transmission region.

In some embodiments, the first major surface comprises a plurality of vertically extending flutes. In some embodiments, the second major surface is smooth. In some embodiments, the second major surface comprises a plurality of vertically extending flutes.

In some embodiments, the light transmission region of the light guide comprises a non-straight path between the light receiving surface and the light emission region. The non-straight path may comprise a curved portion. In some embodiments, the arc length of a second major surface of the light transmission region corresponds to an arc measure of less than 90 degrees, or less than 80 degrees. In some embodiments, the height of the light emission region is from 80% to 120% of the height of the light transmission region.

In some embodiments, the plurality of vertically extending flutes of the light emission region may extend into at least a portion of the light transmission region. In some embodiments, the light receiving surface may be in a substantially vertical plane. The light guide may further comprise a substantially straight path between the light receiving surface and the distal end.

In some embodiments, the light emission region of the light guide is a closed shape. The closed shape may be a circle, an ellipse or a polygon. In some embodiments, the light emission region is an open shape. The open shape may be straight, bent or curved.

In some embodiments, one or both of the first and second major surfaces have a plurality of steps disposed along the lengths thereof. In some embodiments, the first major surface includes a plurality of steps disposed along its length and the second major surface is smooth.

In some embodiments, the plurality of steps each comprise a first surface and a second surface defining an angle therebetween. The angle may be between about 75 degrees and about 110 degrees.

In some embodiments, one or both of the first and second major surfaces include a plurality of flutes extending along the lengths thereof. In some embodiments, only the first major surface includes a plurality of flutes.

One aspect of the invention provides a luminaire assembly. The luminaire assembly has a housing, at least one light guide, a light source and a diffuser. In some embodiments, the housing has opposing first and second sides and opposing third and fourth sides. The at least one light guide has a light receiving surface, a first major surface and an opposing second major surface. The first and second major surfaces may taper toward each other to define a distal end. The light source may be positioned on the first side of the housing and faces the light receiving surface. The light source may be positioned at an angle relative to the light receiving surface.

The light source may be spaced apart from the light receiving surface to define an air gap. The diffuser may extend at least part-way across a length of the housing.

In some embodiments, the at least one light guide has a lip. The lip projects outwardly from the first major surface. The lip may be provided to support an edge of the diffuser.

In some embodiments, the luminaire assembly has a plurality of light guides. In some embodiments, a first light guide and an opposing second light guide are provided. The first and second light guides may be vertically disposed within the housing defining a cavity therebetween. In some embodiments, the first and second light guides are in mirrored configurations. In some embodiments, the first major surface faces away from the cavity and the second major surface faces towards the cavity.

In addition to the exemplary aspects and embodiments described above, further aspects and embodiments will become apparent by reference to the drawings and by study of the following detailed descriptions.

BRIEF DESCRIPTION OF DRAWINGS

The accompanying drawings illustrate non-limiting example embodiments of the invention.

FIGS. 24A to 24C show cross sectional views of an increasing number of paths of exemplary light rays internally reflecting and then refracting out of a light guide according to the embodiment shown in FIG. 23.

FIG. 25 is an optical distribution plot of light emitted at various luminous intensities from the embodiment shown in FIG. 23 in accordance with FIGS. 24A to 24C.

DESCRIPTION

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

The term "proximal" as used herein means a position relatively closer to the light receiving surface of the light guide, and the term "distal" as used herein means a position relatively farther away from the light receiving surface of the light guide.

Aspects of the invention relate to light guides having a light transmission region and a wedge shaped light emission region. At least one side of the light emission region has a plurality of vertically extending flutes. At least one side of the light emission region may be stepped. Incident light travels by total internal reflection through the light transmission region and is extracted at the light emission region. Aspects of the invention also relate to luminaires incorporating such light guides.

Figures 1, 1A:
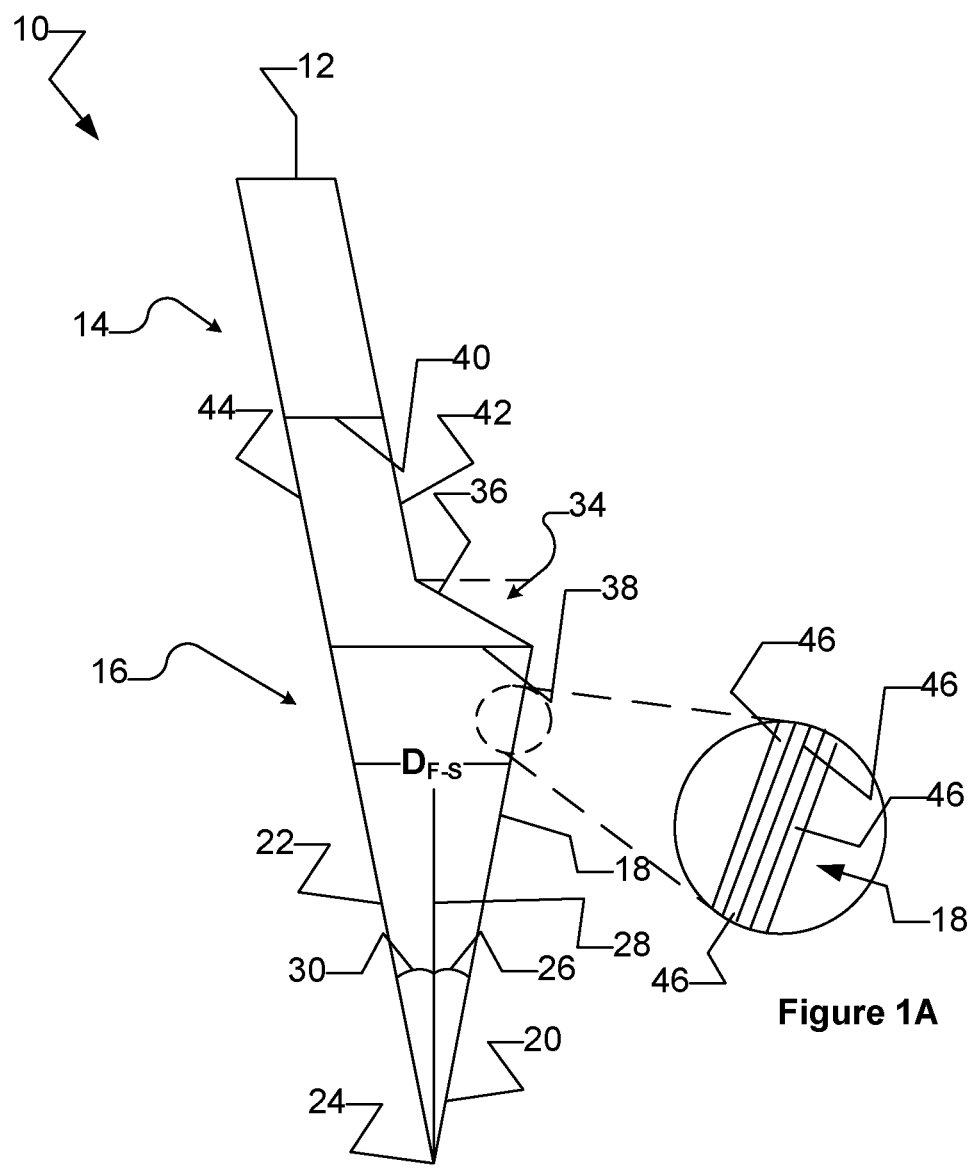
FIG. 1 is a cross sectional view of a light guide according to an embodiment of the invention.
FIG. 1A is an enlarged partial view of the area indicated by the circle in FIG. 1.

FIG. 1 shows a light guide 10 according to an embodiment. Light guide 10 includes a light receiving surface 12, a light transmission region 14, a transition region 34 and a light emission region 16. Light receiving surface 12 may be in a substantially horizontal plane. Light receiving surface 12 may be an optically smooth surface. In some embodiments, light receiving surface 12 is in a plane other than a substantially horizontal plane. Light receiving surface 12 may be in optical communication with light transmission region 14, which may be in optical communication with transition region 34, which may be in optical communication with light emission region 16. In some embodiments, light receiving surface 12, light transmission region 14, transition region 34 and light emission region 16 are integrally formed and have a unitary structure.

Light transmission region 14 has a first major surface 42 which is continuous with a return surface 36 of transition region 34, which is continuous with a first major surface 18 of light emission region 16. A second major surface 44 of light transmission region 14 is smooth and forms a continuous flat surface with a second major surface 22 of light emission region 16. In some embodiments, as illustrated, first major surface 42 and second major surface 44 may be parallel. In some embodiments, first major surface 42 and second major surface 44 may diverge in a distal direction. In some embodiments, first major surface 18 and second major surface 22 may converge in a distal direction.

In some embodiments, a maximum thickness 38 of light emission region 16 may be at least 1.5 times, or 2 times, a maximum thickness 40 of light transmission region 14.

Light emission region 16 has a wedge-shaped cross section formed by first major surface 18 and second major surface 22. First major surface 18 may have a plurality of longitudinally extending flutes 46. Flutes 46 may be rounded grooves. FIG. 1A is an enlarged view of first major surface 18 showing an example of flutes 46. Second major surface 22 may be smooth. First major surface 18 and second major surface 22 taper toward each other to define a distal end 24. Distal end 24 may be a point (in cross section) or a sharp edge. As illustrated, light guide 10 provides a substantially straight path from light receiving surface 12 to distal end 24.

A first inner angle 26 is defined by first major surface 18 relative to an imaginary vertical line 28, and a second inner angle 30 is defined by second major surface 22 relative to imaginary vertical line 28. In some embodiments, first inner angle 26 and second inner angle 30 may each range from about 2 degrees to about 15 degrees. In some embodiments, first inner angle 26 and second inner angle 30 may be substantially similar to form a symmetrical wedge shape.

In operation, substantially all light received at light receiving surface 12 travels by total internal reflection through light transmission region 14 and transition region 34 before entering light emission region 16. Light reflects off fluted first major surface 18 at progressively higher angles until it refracts out of light emission region 16.

Figure 2:
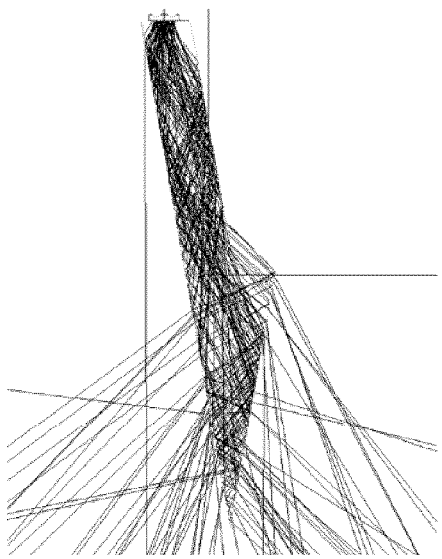
FIG. 2 shows a cross sectional view of paths of exemplary light rays internally reflecting and then refracting out of a light guide according to the embodiment shown in FIG. 1.
Figure 3:
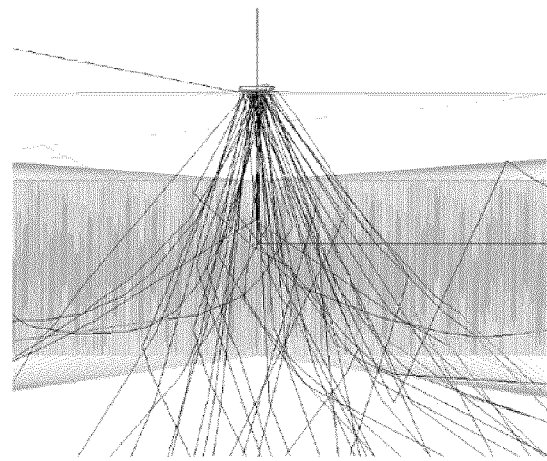
FIG. 3 shows a front view of paths of exemplary light rays internally reflecting and then refracting out of a light guide according to the embodiment shown in FIG. 1.
Figure 4:
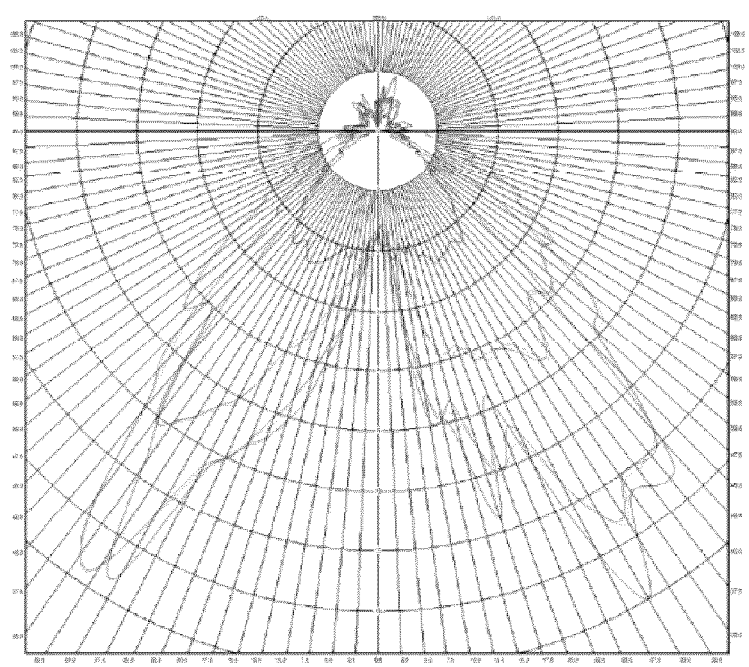
FIG. 4 is an optical distribution plot of light emitted at various luminous intensities from the embodiment shown in FIG. 1 in accordance with FIGS. 2 and 3.

FIGS. 2, 3 and 6A to 6I illustrate exemplary paths of rays of light emitted from light guide 10. FIGS. 2 and 3 show exemplary simulated ray traces of light emitted from light guide 10 of multiple ray reactions. The optical distribution of these reactions is plotted in FIG. 4, showing a desirable batwing distribution with peak angles at approximately 30 degrees. FIGS. 6A to 6I show exemplary simulated ray traces of light emitted from light guide 10 of a single ray reaction, where the ray enters light guide 10 from various angles from 0 to 80 degrees; in each reaction, light hits the fluted first major surface 18 and then exits out of both first major surface 18 and second major surface 22 of light emission region 16 at desirable angles.

Figure 5:
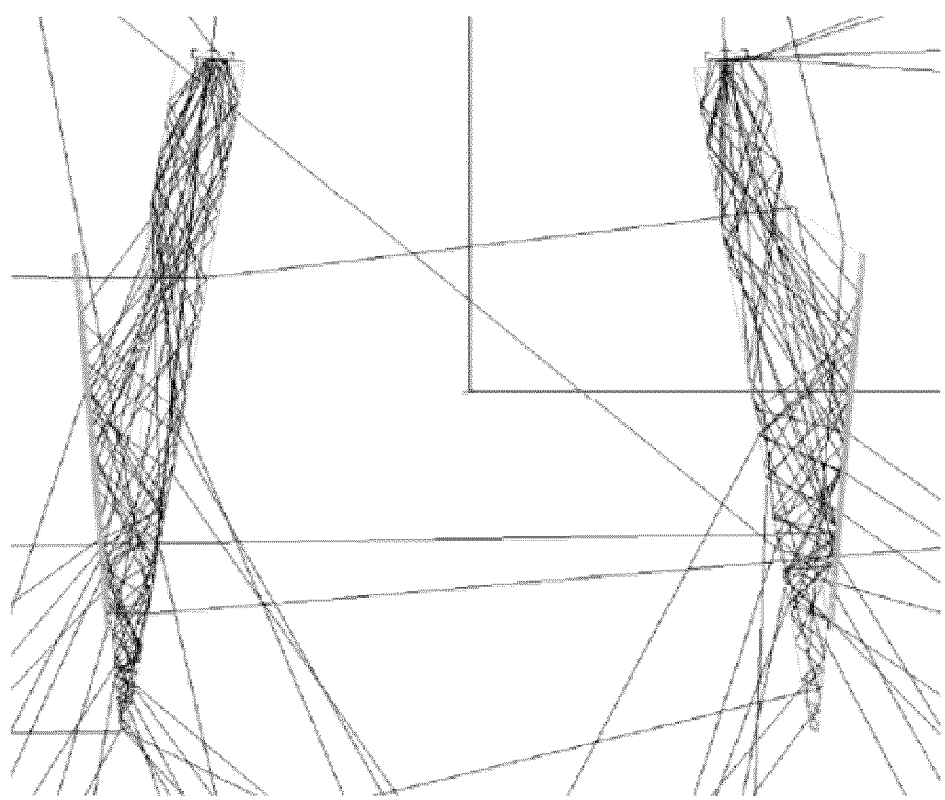
FIG. 5 shows a cross sectional view of paths of exemplary light rays internally reflecting and then refracting out of two light guides according to the embodiment shown in FIG. 1 in mirrored position.
Figure 6A:
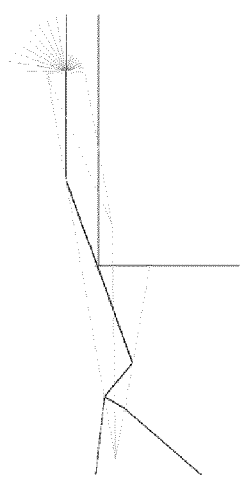
FIGS. 6A to 6I show cross sectional views of a path of an exemplary light ray internally reflecting and then refracting out of a light guide according to the embodiment shown in FIG. 1, wherein the light ray enters the light guide at an incident angle of 0, 10, 20, 30, 40, 50, 60, 70 and 80 degrees respectively.
Figure 6B:
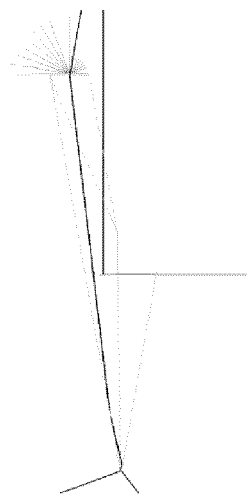
Figure 6C:
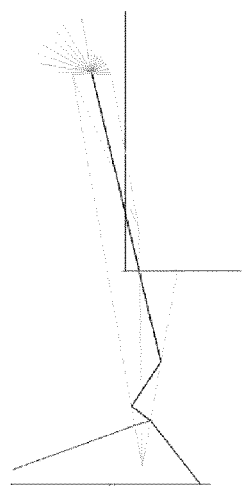
Figure 6D:
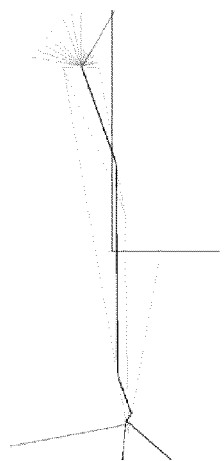
Figure 6E:
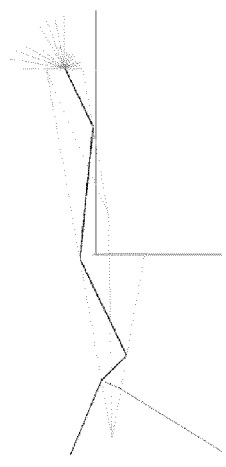
Figure 6F:
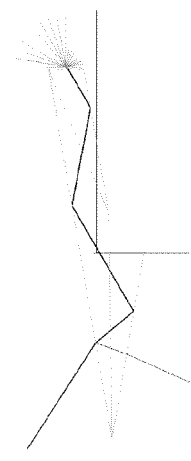
Figure 6G:
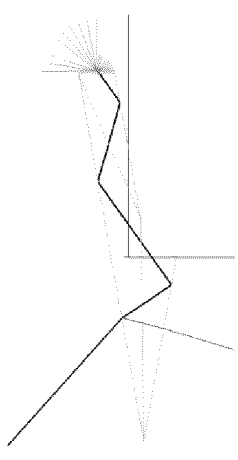
Figure 6H:
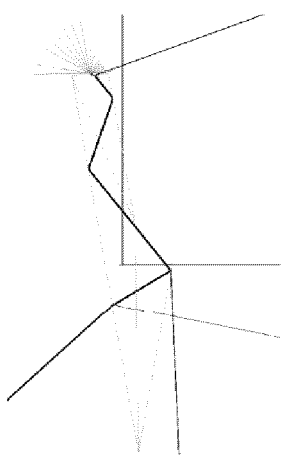
Figure 6I:
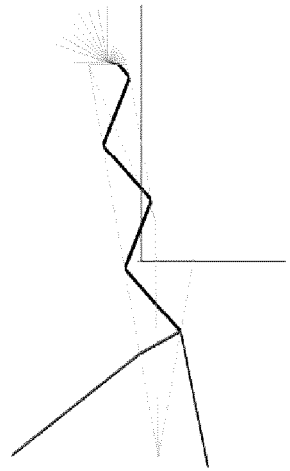

FIG. 5 illustrates an embodiment of the invention where light guide 10 is in a mirrored configuration.

Figure 7:
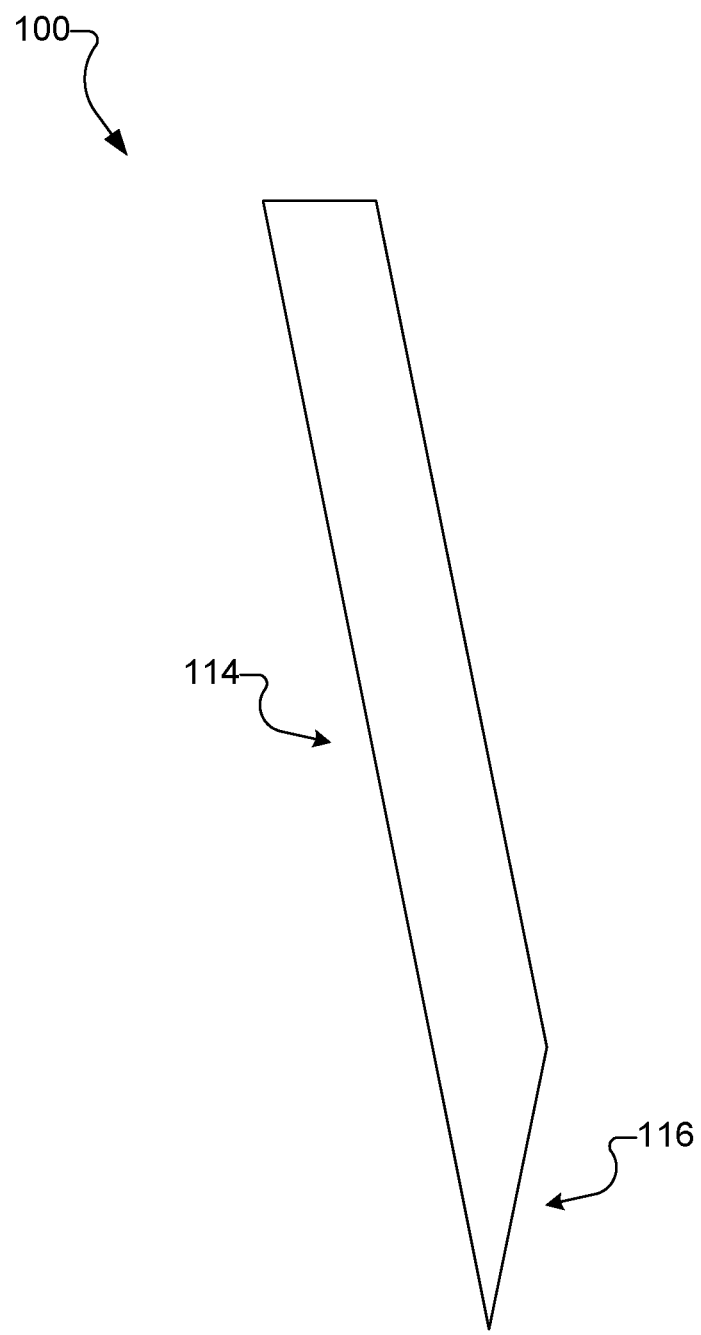
FIG. 7 is cross sectional view of a light guide according to another embodiment.

FIG. 7 shows a light guide 100 according to an embodiment of the invention. Light guide 100 is similar to light guide 10 but lacks transition region 34, and as a consequence has a much smaller light emission region 116. Light transmission region 114 and light emission region 116 may be integrally formed and unitary.

Figure 8:
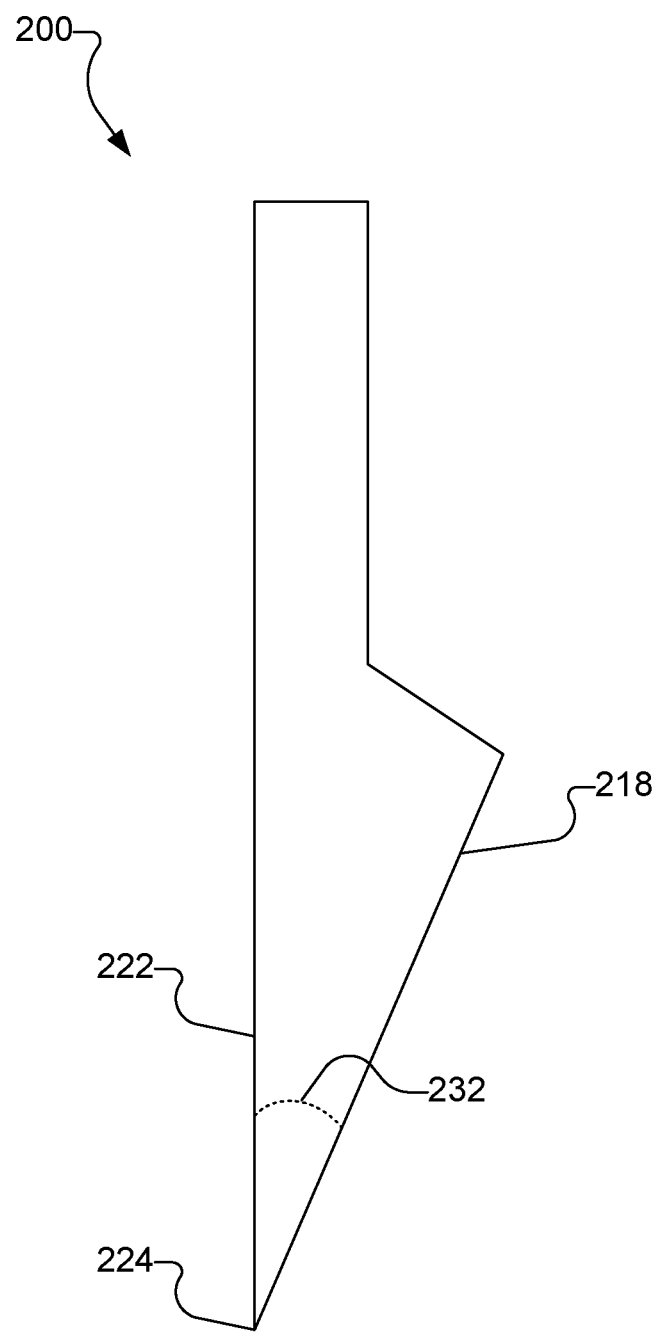
FIG. 8 is cross sectional view of a light guide according to another embodiment.

FIG. 8 shows a light guide 200 according to an embodiment of the invention. Light guide 200 is similar to light guide 10, except second major surface 222 is substantially vertical. At distal end 224 an inner angle 232 defined between first major surface 218 and second major surface 222 may range from 4 degrees to 30 degrees.

Figure 9A:
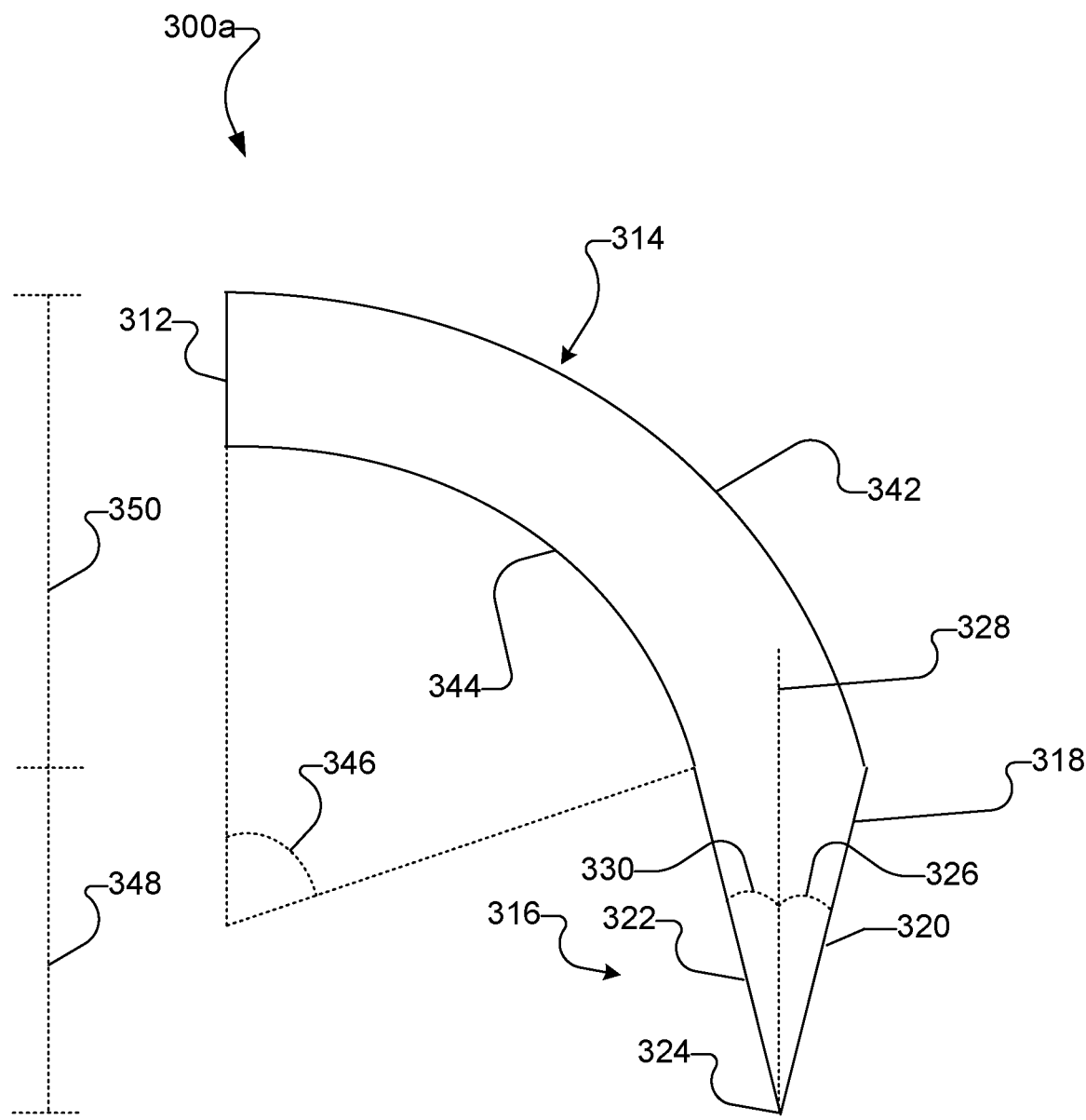
FIG. 9A is cross sectional view of a light guide according to another embodiment.

FIG. 9A shows a light guide 300a according to an embodiment of the invention. Light guide 300a is similar to light guide 10 but has a light transmission region 314 that curves from light receiving surface 312 to light emission region 316. An arc length of a second major surface 344 of light transmission region 314 corresponds to an arc measure 346 of less than 90 degrees. In some embodiments, arc measure 346 may be less than 80 degrees.

Also in contrast to light guide 10, light receiving surface 312 of light guide 300a is in a substantially vertical plane, allowing light sources to be positioned laterally around the light guide, as shown for light guide 300 in FIGS. 15 to 18. Also as shown in FIGS. 15 to 18, the plurality of vertically extending flutes 320 of first major surface 318 of light emission region 316 may extend into at least a portion of a first major surface 342 of light transmission region 314. A height 348 of light emission region 316 may be from 80% to 120% of a height 350 of light transmission region 314.

Figure 9B:
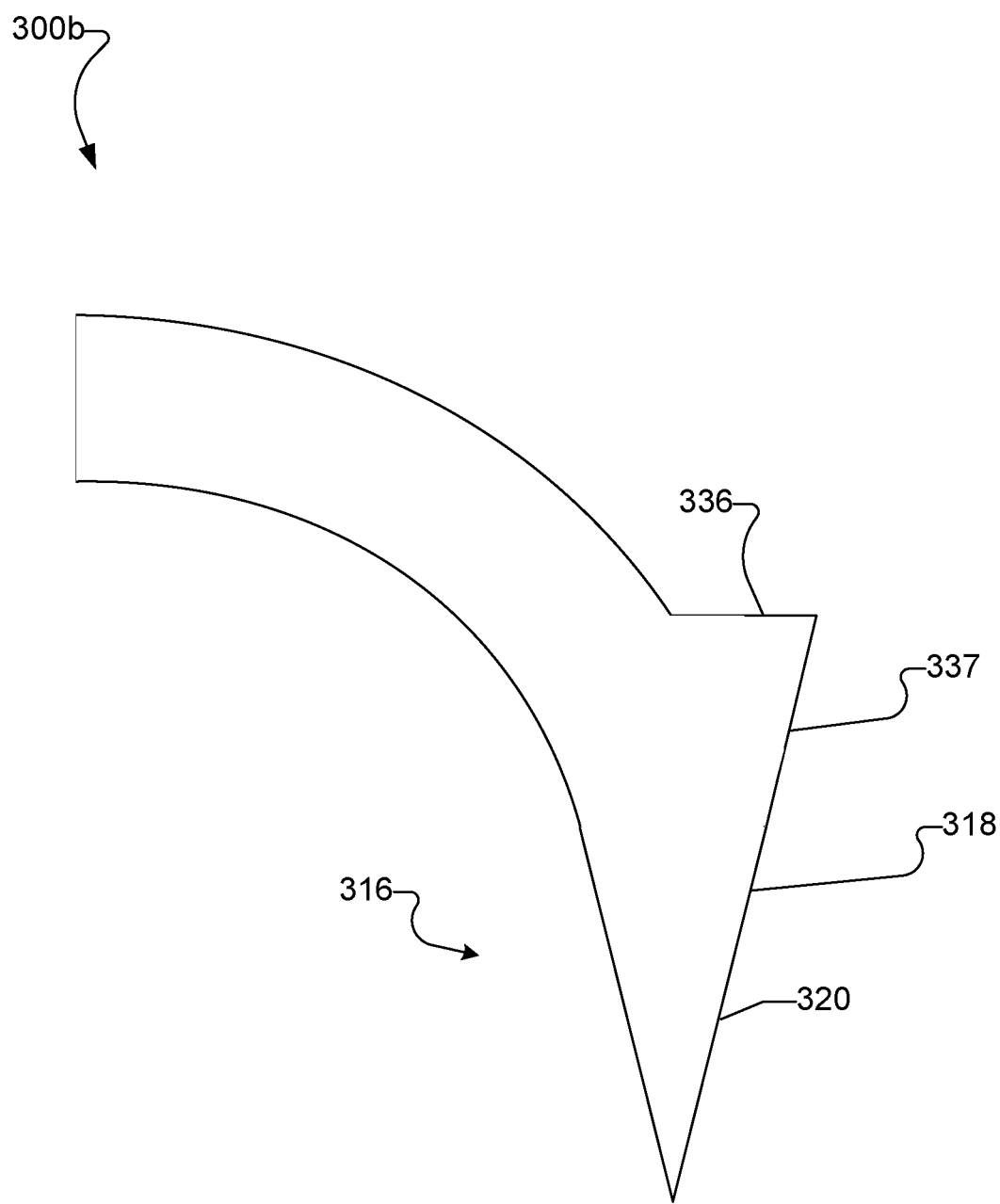
FIG. 9B is cross sectional view of a light guide according to another embodiment.

FIG. 9B shows a light guide 300b according to an embodiment of the invention. Light guide 300b is similar to light guide 300a but light emission region 316 is extended at first major surface 318 by a first extension surface 337 and first return surface 336. The plurality of vertically extending flutes 320 of first major surface 318 of light emission region 316 extend into at least a portion, or all, of first extension surface 337.

Figure 10:
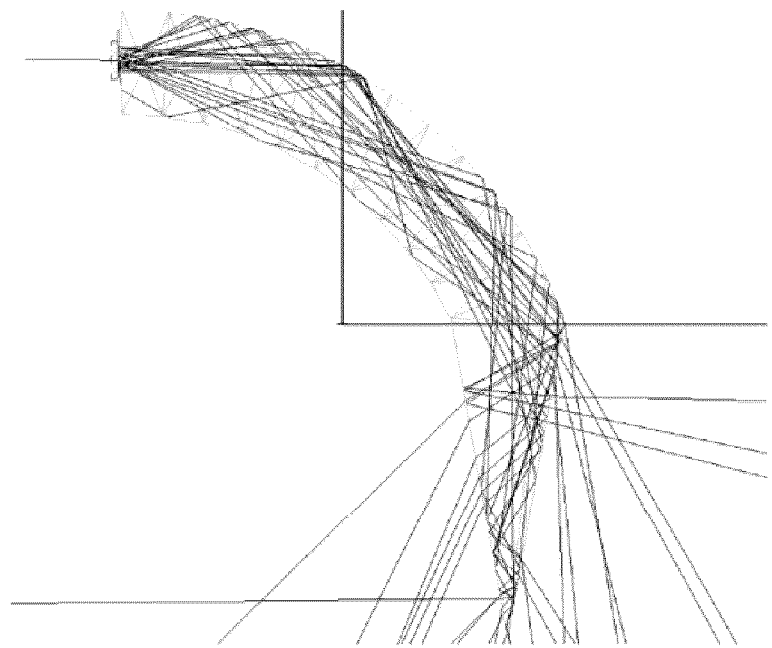
FIG. 10 shows a cross sectional view of paths of exemplary light rays internally reflecting and then refracting out of a light guide according to the embodiment shown in FIG. 9A.
Figure 11:
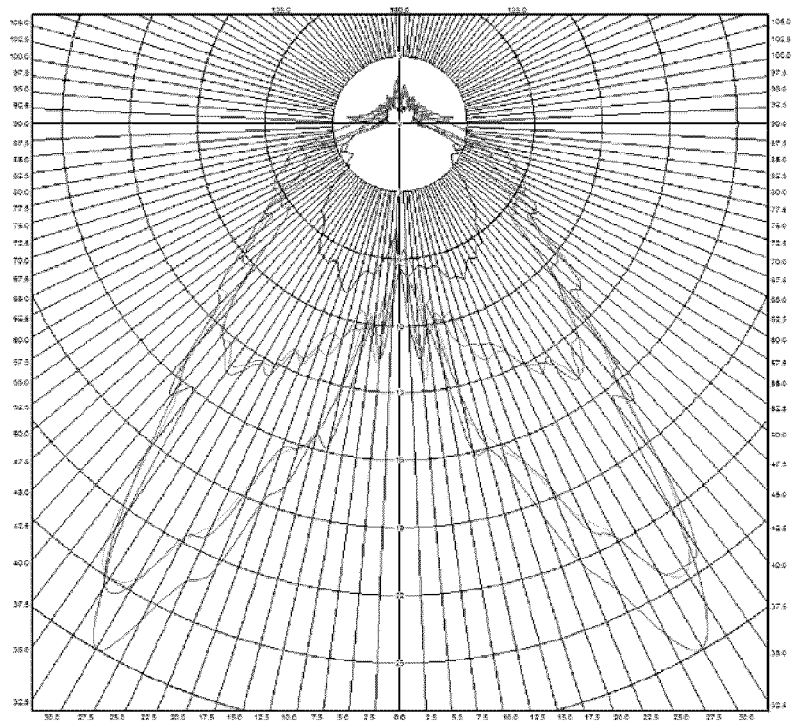
FIG. 11 is an optical distribution plot of light emitted at various luminous intensities from the embodiment shown in FIG. 9A in accordance with FIG. 10.
Figure 12A:
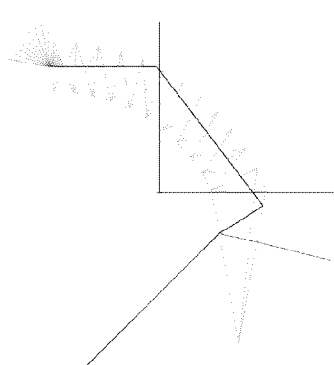
FIGS. 12A to 12G show cross sectional views of a path of an exemplary light ray internally reflecting and then refracting out of a light guide according to the embodiment shown in FIG. 9A, wherein the light ray enters the light guide at an incident angle of 0, 10, 20, 30, 40, 50, 60 and 70 degrees respectively.
Figure 12B:
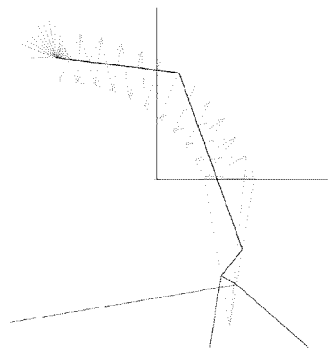
Figure 12C:
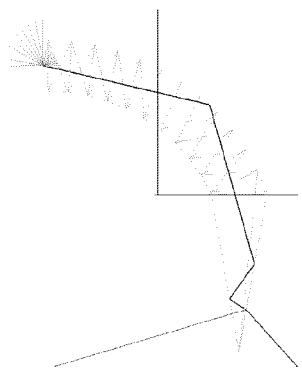
Figure 12D:
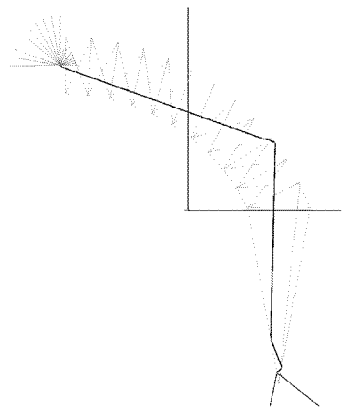
Figure 12E:
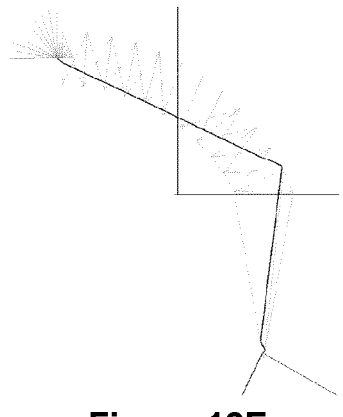
Figure 12F:
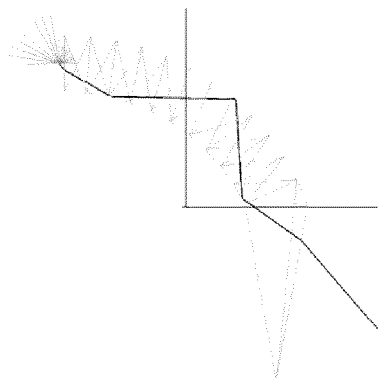
Figure 12G:
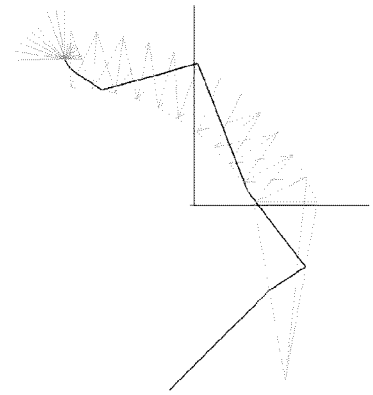

FIGS. 10 and 12A to 12G illustrate exemplary paths of rays of light emitted from light guide 300a. FIG. 10 shows exemplary simulated ray traces of light emitted from light guide 300a of multiple ray reactions. The optical distribution of these reactions is plotted in FIG. 11, showing a desirable batwing distribution with peak angles at approximately 40 degrees. FIGS. 12A to 12G show exemplary simulated ray traces of light emitted from light guide 300a of a single ray reaction, where the ray enters light guide 300a from various angles from 0 to 60 degrees; in each reaction, light hits the fluted first major surface 318 and then exits out of one or both of first major surface 318 and second major surface 322 of light emission region 316 at desirable angles.

Figure 13:
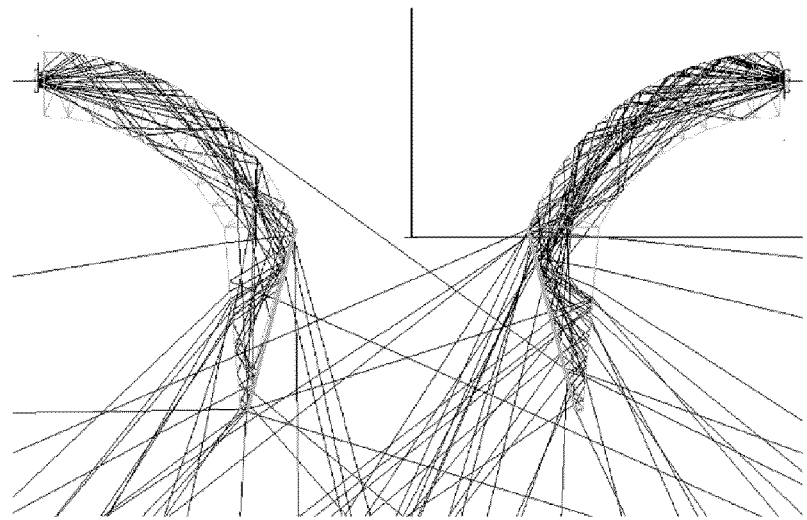
FIG. 13 shows a cross sectional view of paths of exemplary light rays internally reflecting and then refracting out of two light guides according to the embodiment shown in FIG. 9A in mirrored position.
Figure 14:
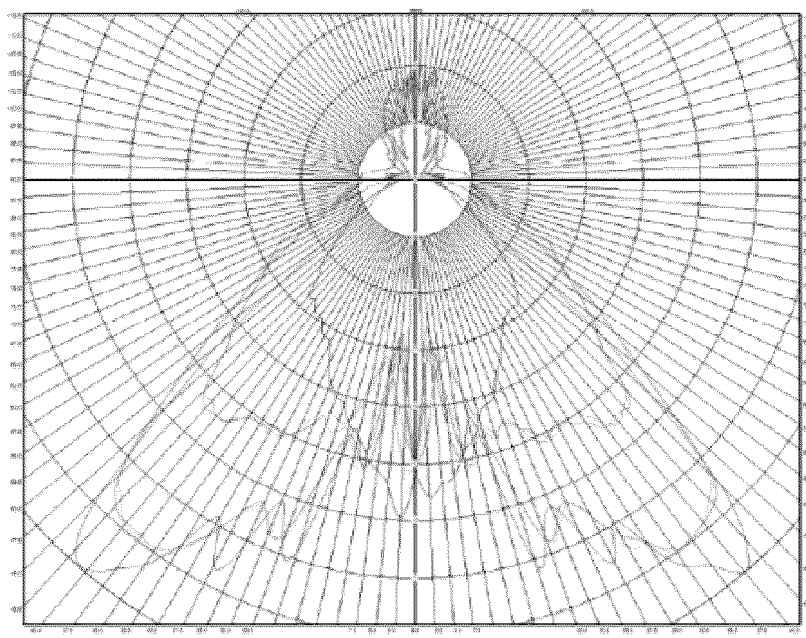
FIG. 14 is an optical distribution plot of light emitted at various luminous intensities from the embodiment shown in FIG. 9A in accordance with FIG. 13.
Figure 15:
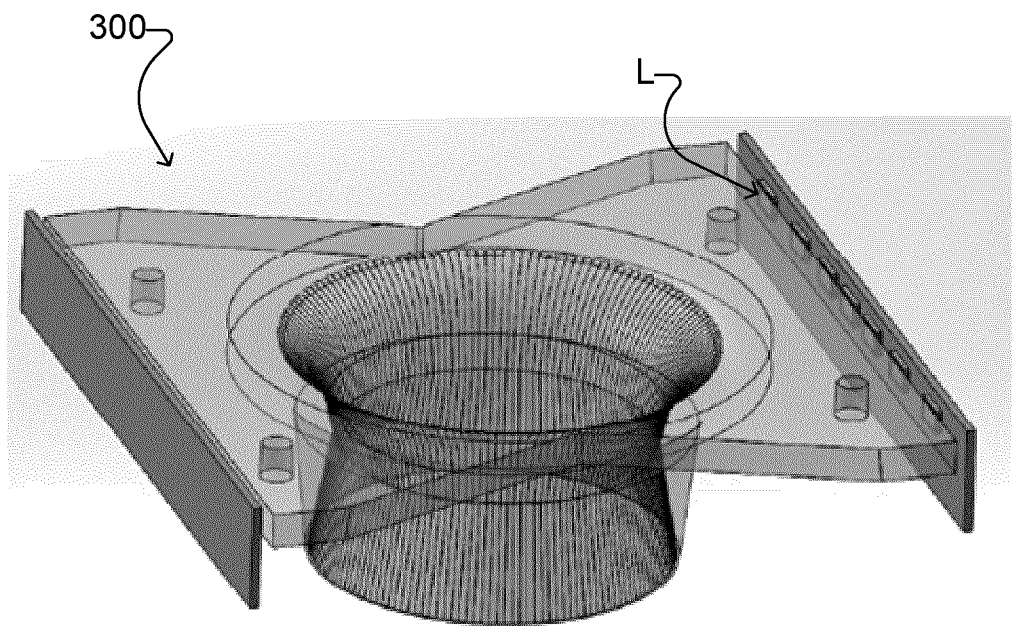
FIG. 15 is a top isometric view of a light guide with light sources according to another embodiment of the invention.
Figure 16:
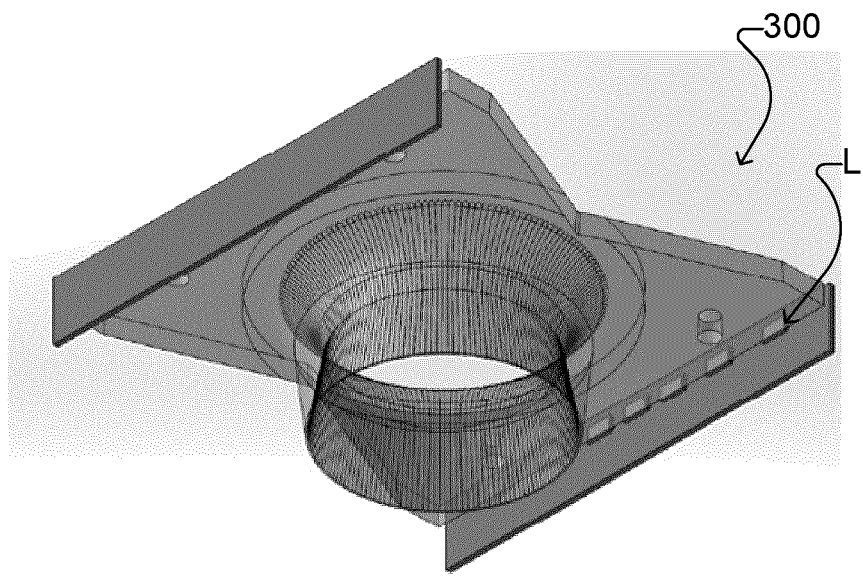
FIG. 16 is a bottom isometric view of a light guide with light sources according to the embodiment shown in FIG. 15.

FIG. 13 shows a cross sectional view of paths of exemplary light rays internally reflecting and then refracting out of two light guides 300a in mirrored position. The optical distribution of light emitted at various luminous intensities from the two light guides 300a shown in FIG. 13 is plotted in FIG. 14.

FIGS. 15, 16, 17A and 18A show light guide 300 in its entirety, in relation to light sources L. As shown in these figures, light guide 300 has a light emission region 316 having a closed shape with an exit hole 352, and in particular a circle. In other embodiments the closed shape may be an ellipse or a polygon. In yet other embodiments, the light emission region may an open shape that, for example, is straight, bent or curved.

Figure 17A:
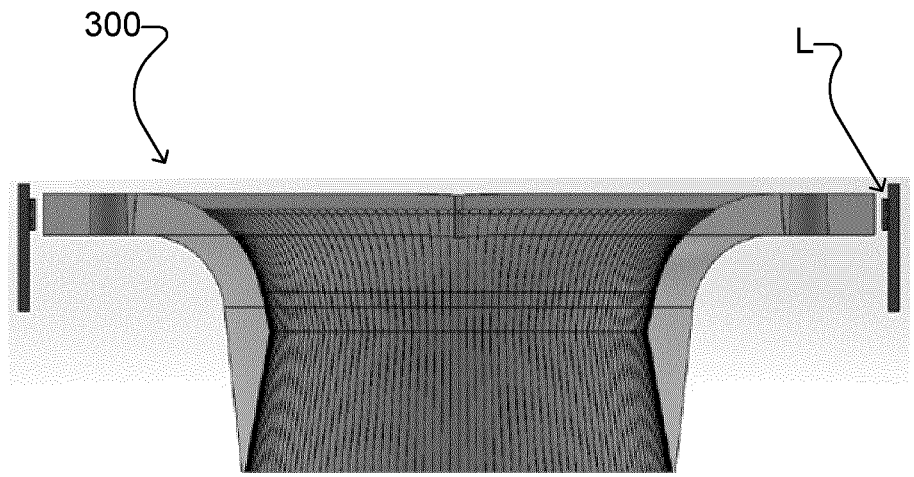
FIG. 17A is a cross sectional view of a light guide with light sources according to the embodiment shown in FIG. 15.
Figure 17B:
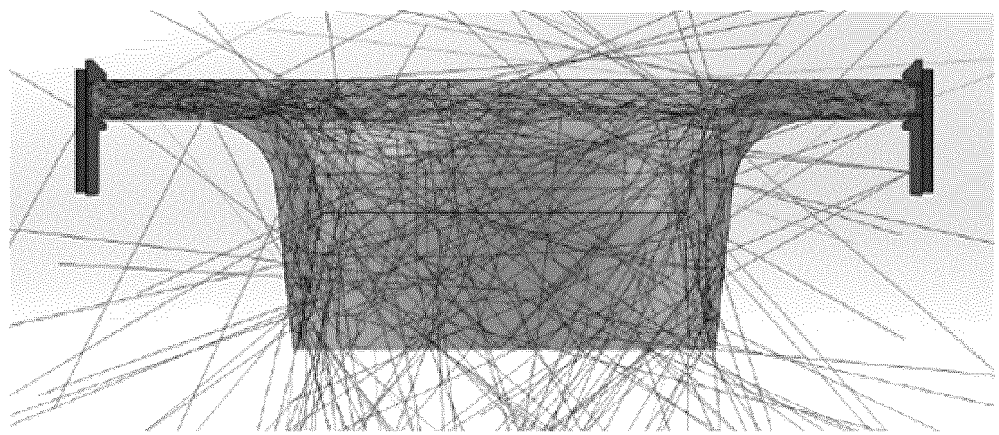
FIG. 17B shows a cross sectional view of paths of exemplary light rays internally reflecting and then refracting out of a light guide according to the embodiment shown in FIG. 15.
Figure 18A:
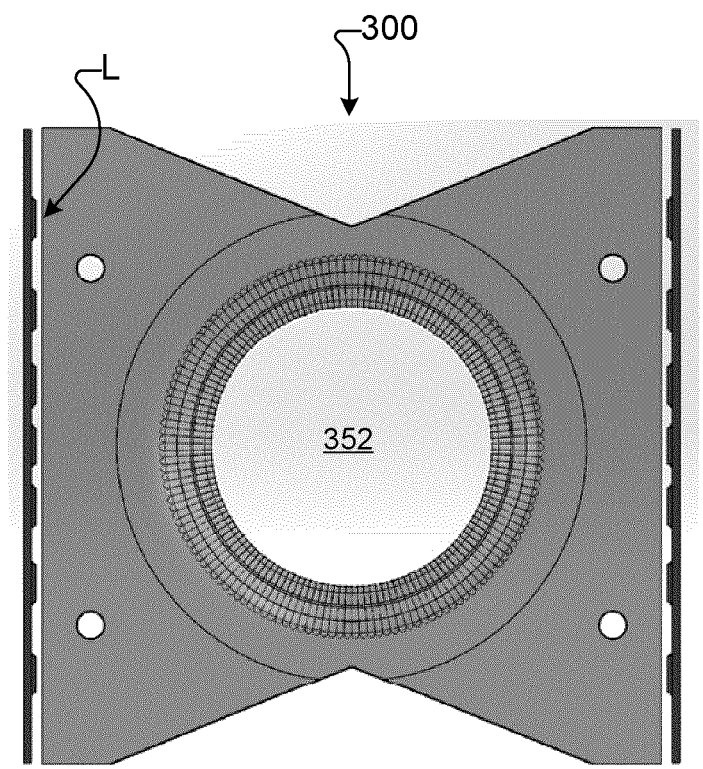
FIG. 18A is a top view of a light guide with light sources according to the embodiment shown in FIG. 15.
Figure 18B:
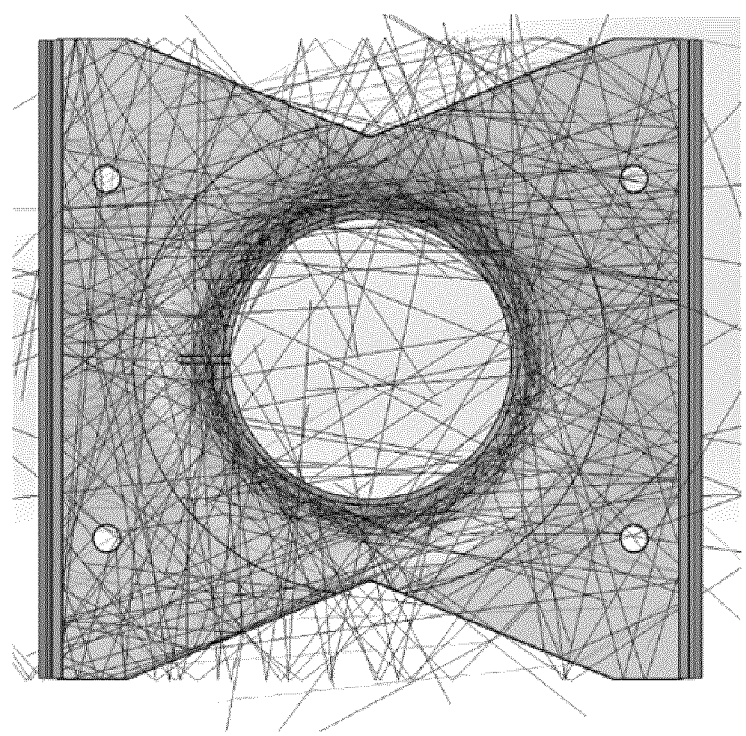
FIG. 18B shows a bottom view of paths of exemplary light rays internally reflecting and then refracting out of a light guide according to the embodiment shown in FIG. 13.

FIGS. 17B and 18B illustrate exemplary simulated ray traces of light emitted from light guide 300 of multiple ray reactions.

Figure 19:
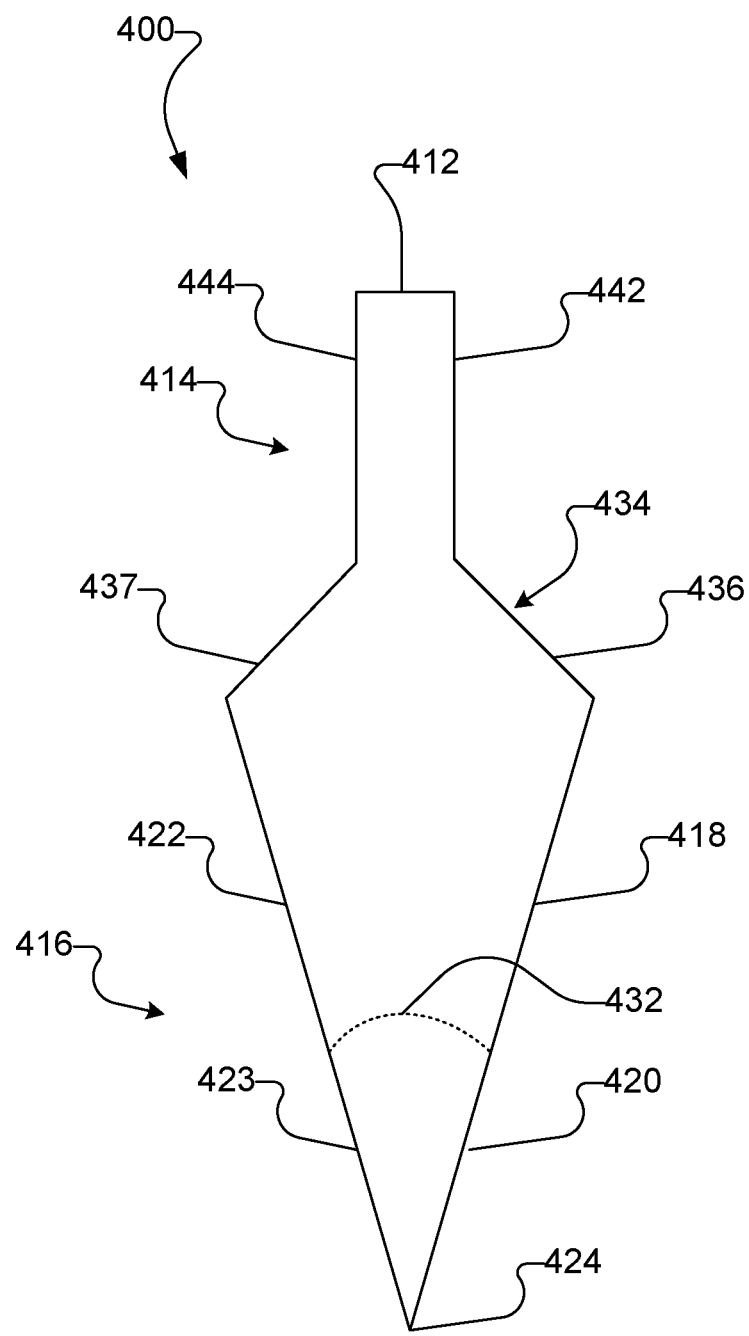
FIG. 19 is cross sectional view of a light guide according to another embodiment.

FIG. 19 shows a light guide 400 according to an embodiment of the invention. Light guide 400 is similar to light guide 10 except second major surface 422 of light emission region 416 also includes a plurality of vertically extending flutes 423 similar to the plurality of vertically extending flutes 420 of first major surface 418 of light emission region 416. Also, transition region 434 is further defined by a second return surface 437 between second major surface 422 of light emission region 416 and a second major surface 444 of light transmission region 414.

Figure 20:
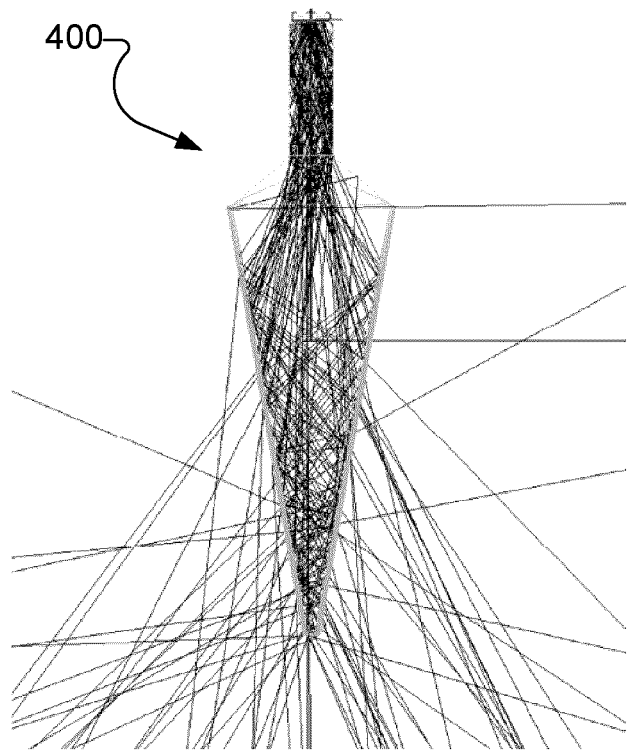
FIG. 20 shows a cross sectional view of paths of exemplary light rays internally reflecting and then refracting out of a light guide according to the embodiment shown in FIG. 19.
Figure 21:
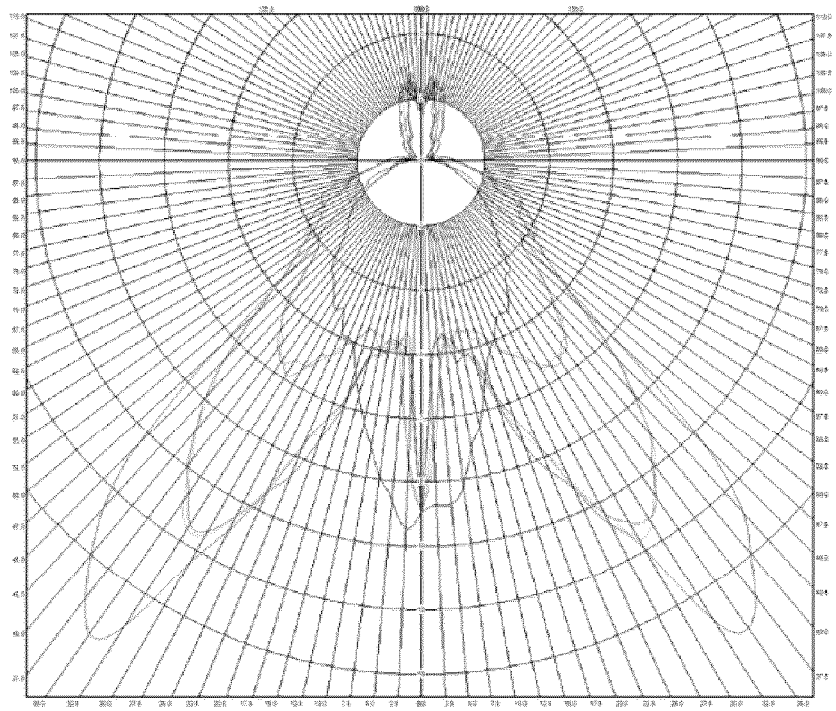
FIG. 21 is an optical distribution plot of light emitted at various luminous intensities from the embodiment shown in FIG. 19 in accordance with FIG. 20.
Figure 22A:
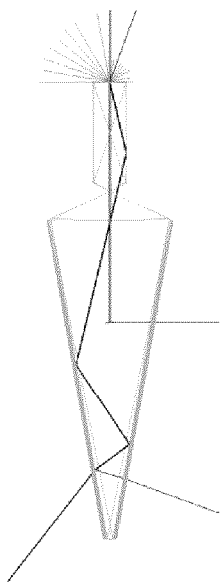
FIGS. 22A to 22G show cross sectional views of a path of an exemplary light ray internally reflecting and then refracting out of a light guide according to the embodiment shown in FIG. 19, wherein the light ray enters the light guide at an incident angle of 20, 30, 40, 50, 60, 70 and 80 degrees respectively.
Figure 22B:
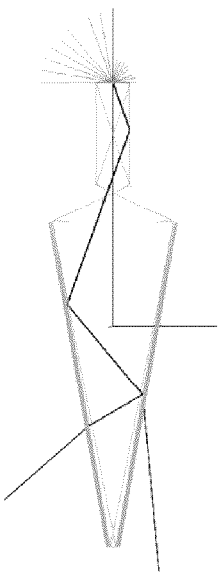
Figure 22C:
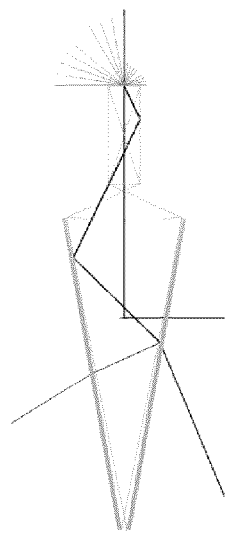
Figure 22D:
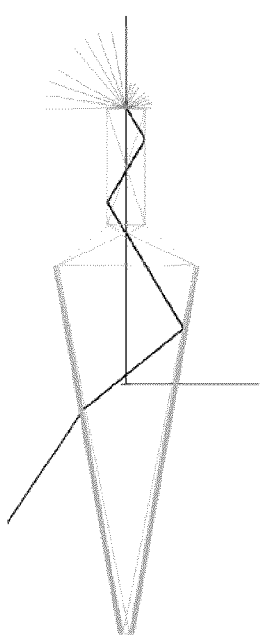
Figure 22E:
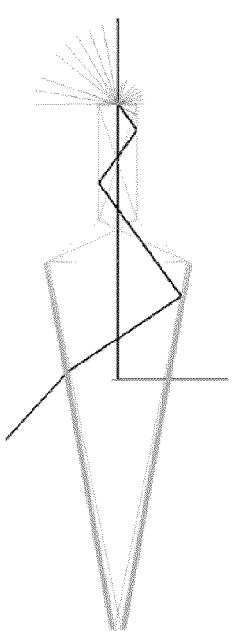
Figure 22F:
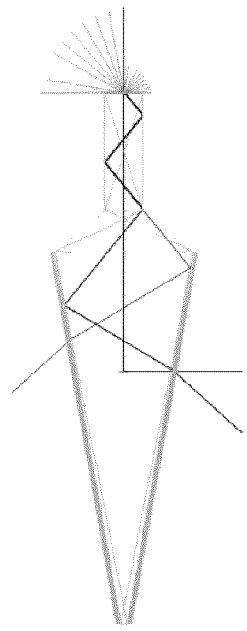
Figure 22G:
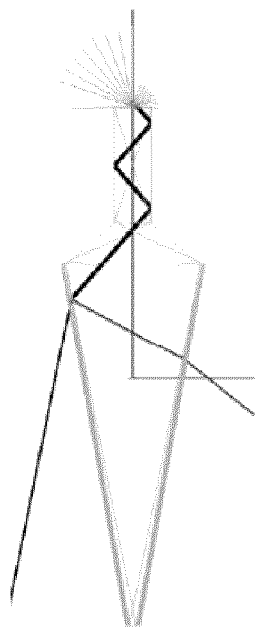

FIGS. 20 and 22A to 22G illustrate exemplary paths of rays of light emitted from light guide 400. FIG. 20 shows exemplary simulated ray traces of light emitted from light guide 400 of multiple ray reactions. The optical distribution of these reactions is plotted in FIG. 21, showing a desirable batwing distribution with peak angles at approximately 35 degrees. FIGS. 22A to 22G show exemplary simulated ray traces of light emitted from light guide 400 of a single ray reaction, where the ray enters light guide 400 from various angles from 20 to 80 degrees; in each reaction, light hits fluted first major surface 418 or fluted second major surface 422 and then exits out of one or both of fluted first major surface 418 or fluted second major surface 422 of light emission region 416 at desirable angles.

Figure 23:
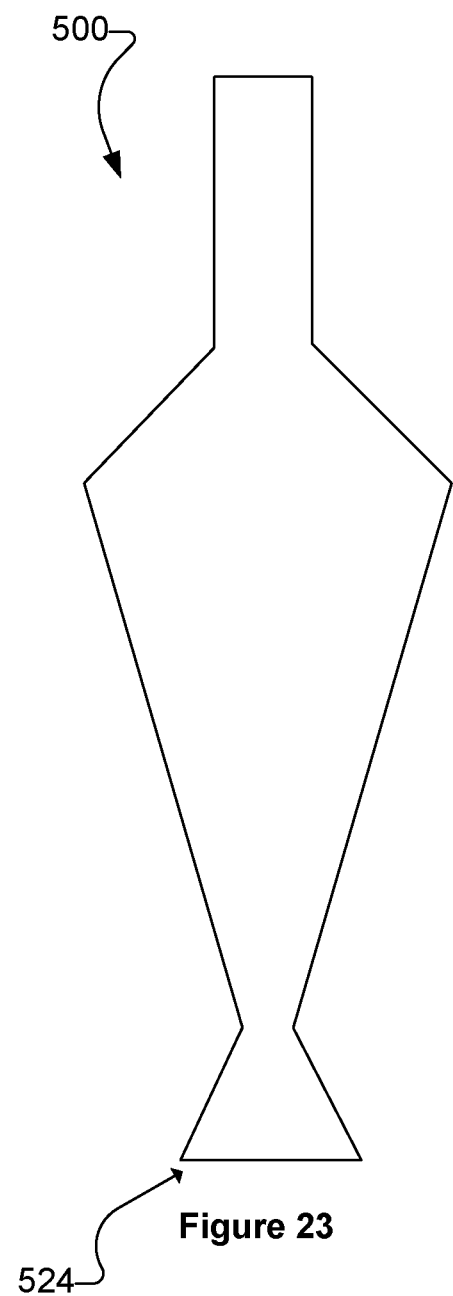
FIG. 23 is cross sectional view of a light guide according to another embodiment.

FIG. 23 shows a light guide 500 according to an embodiment of the invention. Light guide 500 is similar to light guide 400 except distal end 524 has an inverted V-shape.

FIGS. 24A to 24C shows exemplary simulated ray traces of light emitted from light guide 500 of an increasing number of ray reactions. The optical distribution of these reactions is plotted in FIG. 25, showing a desirable batwing distribution with peak angles at approximately 38 degrees.

Figure 26:
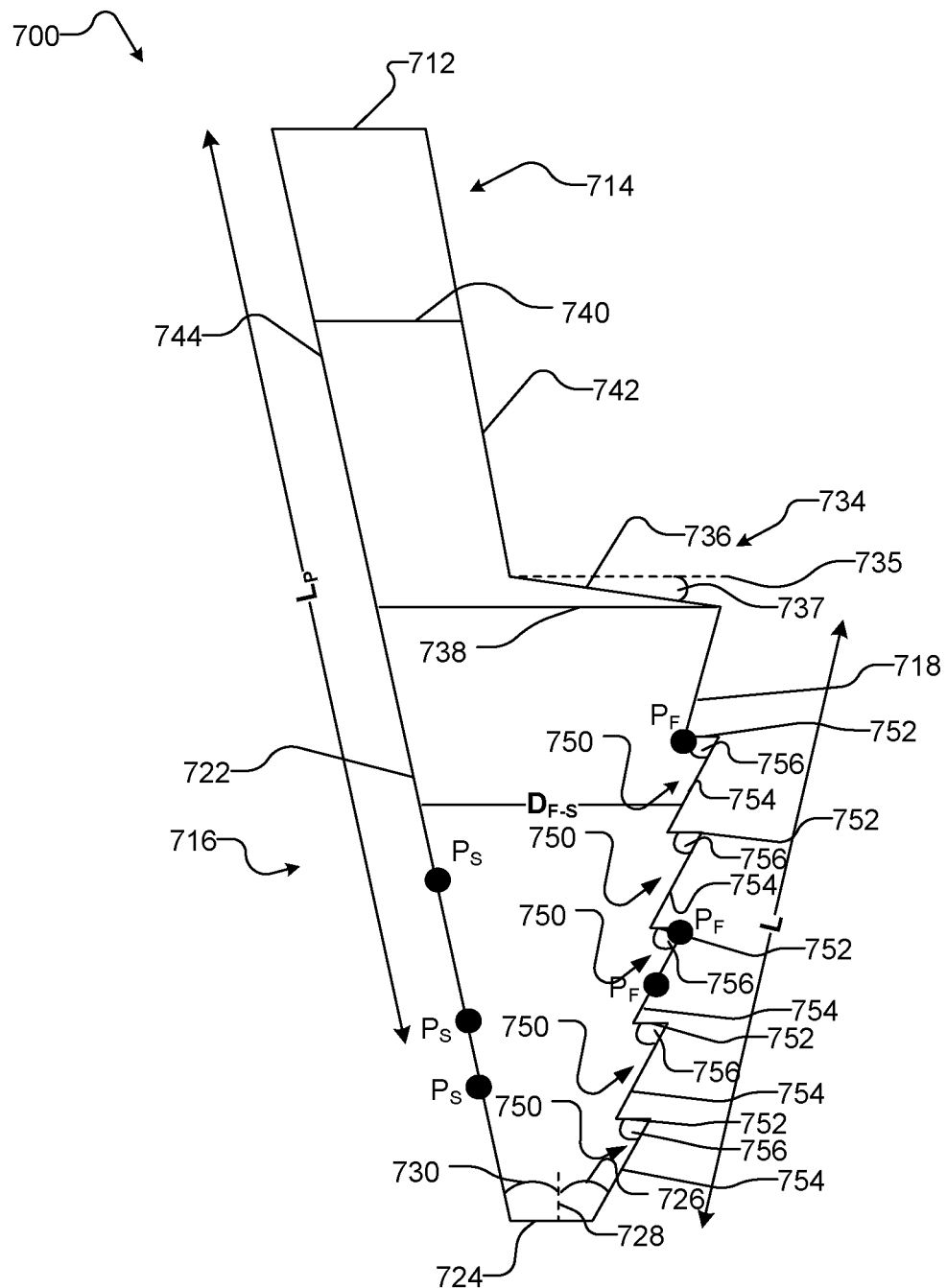
FIG. 26 is a cross sectional view of a light guide according to another embodiment of the invention.

FIG. 26 is a light guide 700 according to another embodiment. Light guide 700 includes a light receiving surface 712, a light transmission region 714, a transition region 734 and a light emission region 716. Light receiving surface 712 may be in a substantially horizontal plane. Light receiving surface 712 may also be in a plane other than a substantially horizontal plane, e.g., light receiving surface may be tilted relative to the horizontal plane such that it forms an angle with the horizontal plane. Light receiving surface 712 may be an optically smooth surface. Light receiving surface 712 may be in optical communication with light transmission region 714, which may be in optical communication with transition region 734, which may be in optical communication with light emission region 716.

Light receiving surface 712, light transmission region 714, transition region 734 and light emission region 716 may be an integrally formed unitary structure. In some embodiments, light transmission region 714 comprises a first major surface 742. First major surface 742 may be continuous with a return surface 736 of transition region 734. Return surface 736 may be continuous with a first major surface 718 of light emission region 716.

In some embodiments, return surface 736 may be oriented at an angle 737 relative to an imaginary line 735. Angle 737 is defined by return surface 736 relative to imaginary line 735. Imaginary line 735 may be substantially perpendicular to second major surface 742. Angle 737 may range from about 0 degrees to about 45 degrees. In some embodiments, angle 737 may range from about 0 to about 10 degrees. In such embodiments, return surface 736 may be substantially parallel to light receiving surface 712 and/or substantially perpendicular to second major surface 742.

In some embodiments, light transmission region 714 includes a second major surface 744. Second major surface 744 may be opposite to first major surface 742. Second major surface 744 may be substantially parallel to first major surface 742. Second major surface 744 may be continuous with a second major surface 722 of light emission region 716. Second major surface 722 may be opposite to first major surface 718.

Light emission region 716 has a wedge-shaped cross-section formed by a first major surface 718 and a second major surface 722. First major surface 718 and second major surface 722 may taper toward each other to define a distal end 724. Distal end 724 may be a point (in cross-section) or a sharp edge. Distal end 724 may be a flat surface (as shown in FIG. 26). Light guide 700 provides a substantially straight path from light receiving surface 712 to distal end 724.

A first inner angle 726 is defined by first major surface 718 relative to an imaginary vertical line 728, and a second inner angle 730 is defined by second major surface 722 relative to imaginary vertical line 728. In some embodiments, first inner angle 726 and second inner angle 730 may each range from 2 degrees to 35 degrees. In some embodiments, first inner angle 726 and second inner angle 730 may be substantially similar to form a symmetrical wedge shape.

In some embodiments, first major surface 718 has a plurality of steps 750A, 750B, 750C, 750D and 750E (collectively, steps 750) disposed along a length L thereof. Any suitable number of steps 750 may be provided. The stepped expansion of light emission region 716 at transition region 734 allows for a greater vertical extraction at light emission region 716, advantageously reducing brightness, as further detailed below. In all embodiments with steps disclosed and illustrated in the Figures, note that the Figures show the steps enlarged for ease of explanation; in other words the actual size of the steps, relative to the rest of the light guide, is much smaller than illustrated.

Figure 26A:
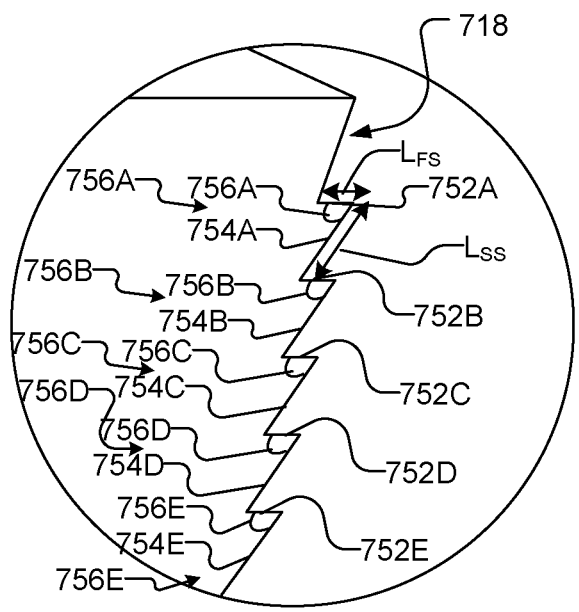
FIG. 26A is an isolated view of a first major surface of a light emission region of the FIG. 26 light guide.

With reference to FIG. 26A, each step 750 may have a first surface 752 and a second surface 754. For example, step 750A has a first surface 752A and a second surface 754A. First surface 752 may be substantially flat. Each of steps 750 may be defined by an angle 756, e.g., angles 756A, 756B, 756C, 756D and 756E respectively. Angle 756 is defined by first surface 752 and second surface 754 of each step 750. In some embodiments, angle 756 is about 75 degrees to 110 degrees. In some embodiments, first surface 752 may be substantially perpendicular to second surface 754.

The first surfaces 752 of each of steps 750 may be disposed substantially parallel to each other. The second surfaces 754 of each of steps 750 may be disposed substantially parallel to each other. Each of angles 756A, 756B, 756C, 756D and 756E may be the same or different. The lengths of first surfaces 752 (LFS) and second surfaces 754 (LSS) of each of steps 750 may also be the same or different.

In some embodiments, second major surface 722 has a plurality of steps (not shown) similar to steps 750 on first major surface 718. In some embodiments, second major surface 722 and first major surface 718 may both have a plurality of steps disposed along their lengths thereof. In some embodiments, a plurality of steps may be provided on either second major surface 722 or first major surface 718.

In the embodiments in which a plurality of steps is provided on both second major surface 722 and first major surface 718, the two surfaces 722, 718 may be substantially identical. In such embodiments, second major surface 722 and first major surface 718 may be in mirrored configurations when viewed at imaginary vertical line 728. This is not mandatory. The number of steps and/or the angles that define each of the steps may differ between the plurality of steps disposed along first major surface 718 and second major surface 722.

Figure 26B:
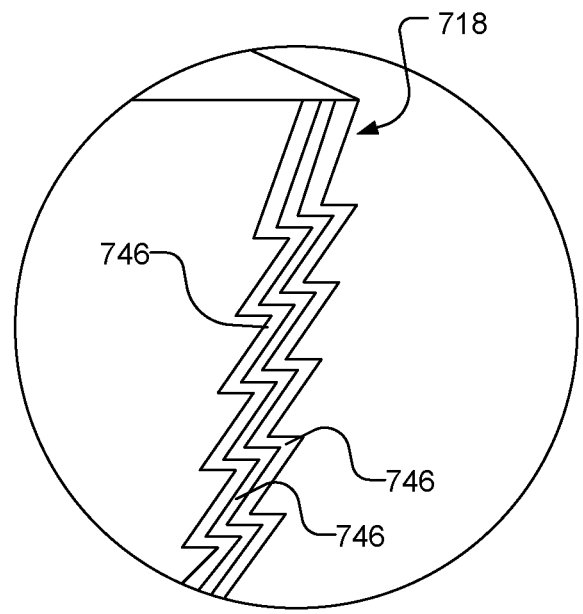
FIG. 26B is an enlarged partial view of the first major surface of FIG. 26A.

As best shown in FIG. 26B, one or both of first major surface 718 and second major surface 722 may comprise a plurality of flutes 746. Flutes 746 may be rounded grooves. Flutes 746 may follow the outer contour of first major surface 718 and second major surface 722. In some embodiments, the plurality of flutes 746 is provided at the surface(s) which has the plurality of steps. In some embodiments, each of first major surfaces 718 and second major surfaces 722 of steps 750 include the plurality of flutes 746.

In operation, substantially all light received at light receiving surface 712 travels by total internal reflection through light transmission region 714 and transition region 734 before entering light emission region 716. Light travels within light emission region 716 and refracts out of light emission region 716 at a plurality of points (PF) along first major surface 718 and/or points (PS) along second major surface 722 (as best shown in FIG. 26). FIG. 26 shows example positions at which points PF and PS may be located but points PF and PS may be located at any point along a length of first major surface 718 or along a length of second major surface 722 respectively. The length between any point PF or PS and light receiving surface 712 at a top end of light guide 700 is denoted by a length (LP) as shown in FIG. 26.

Figure 27A:
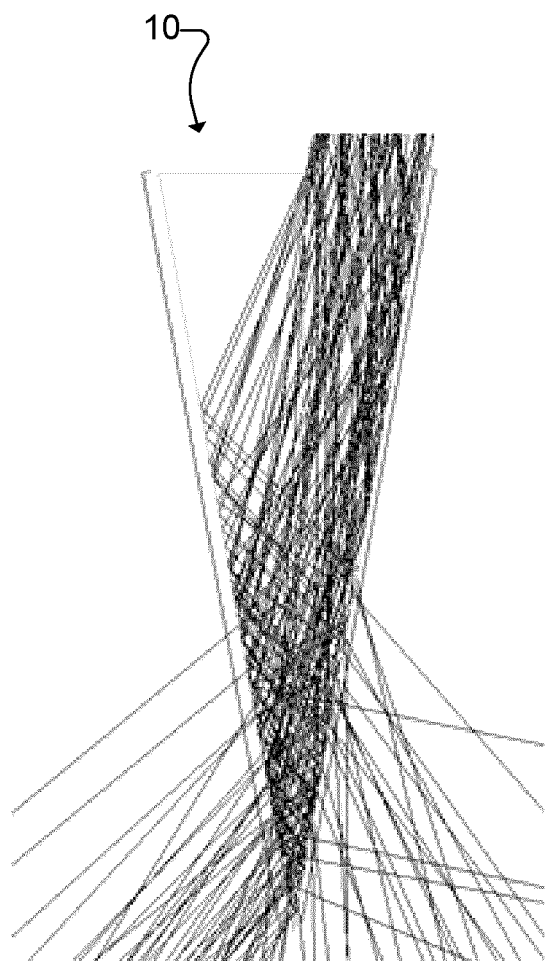
FIG. 27A is a cross sectional view of paths of exemplary internally reflecting within the light emission region of the FIG. 1 light guide and then refracting out thereof.
Figure 27B:
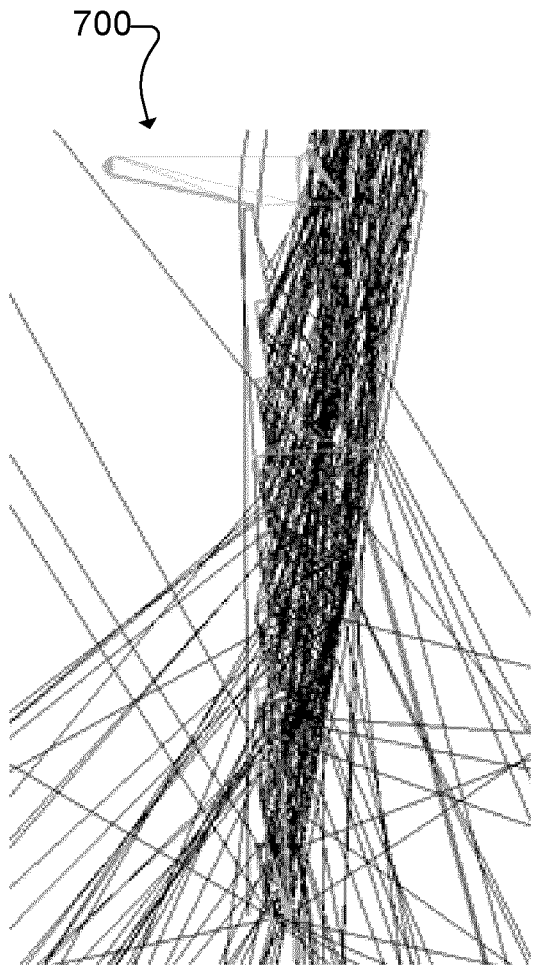
FIG. 27B is a cross sectional view of exemplary internally reflecting within the light emission region of the FIG. 26 light guide and then refracting out thereof.
Figure 28A:
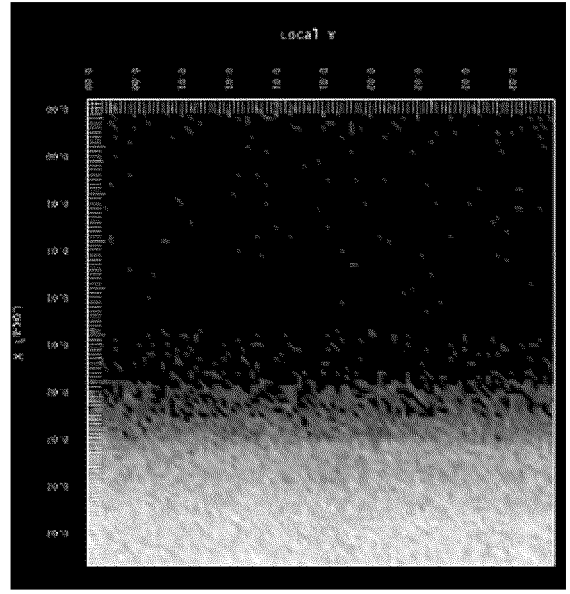
FIG. 28A is a plot showing the distribution of light extracted along a left side of the FIG. 1 light guide.
Figure 28C:
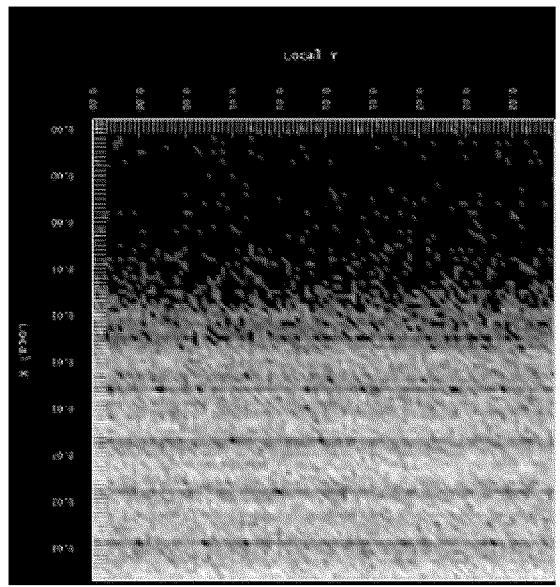
FIG. 28C is a plot showing the distribution of light extracted along a left side of the FIG. 26 light guide.
Figure 28B:
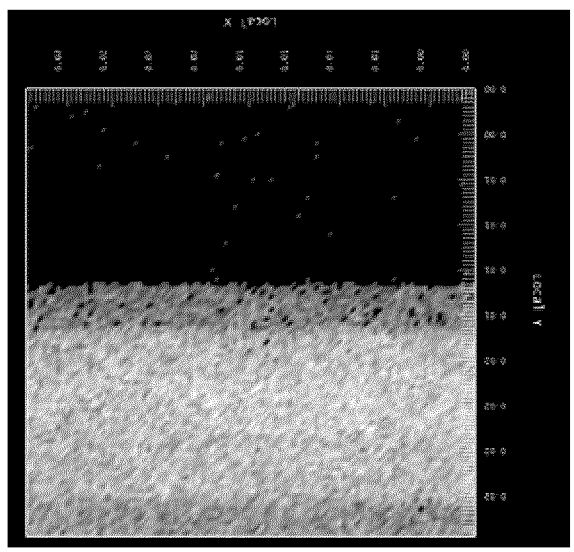
FIG. 28B is a plot showing the distribution of light extracted along a right side of the FIG. 1 light guide.
Figure 28D:
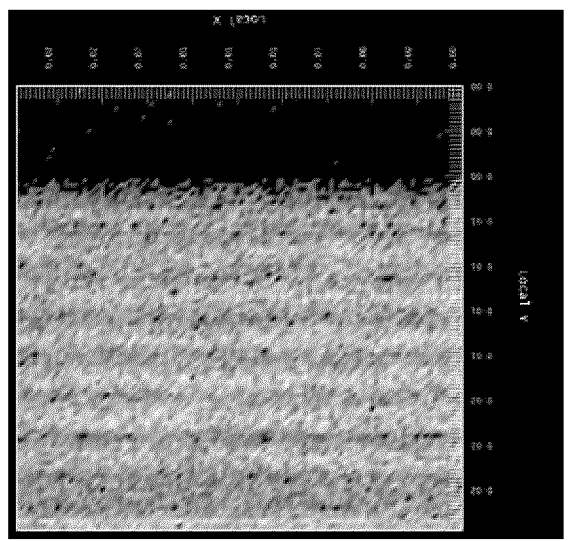
FIG. 28D is a plot showing the distribution of light extracted along a right side of the FIG. 26 light guide.
Figure 29A:
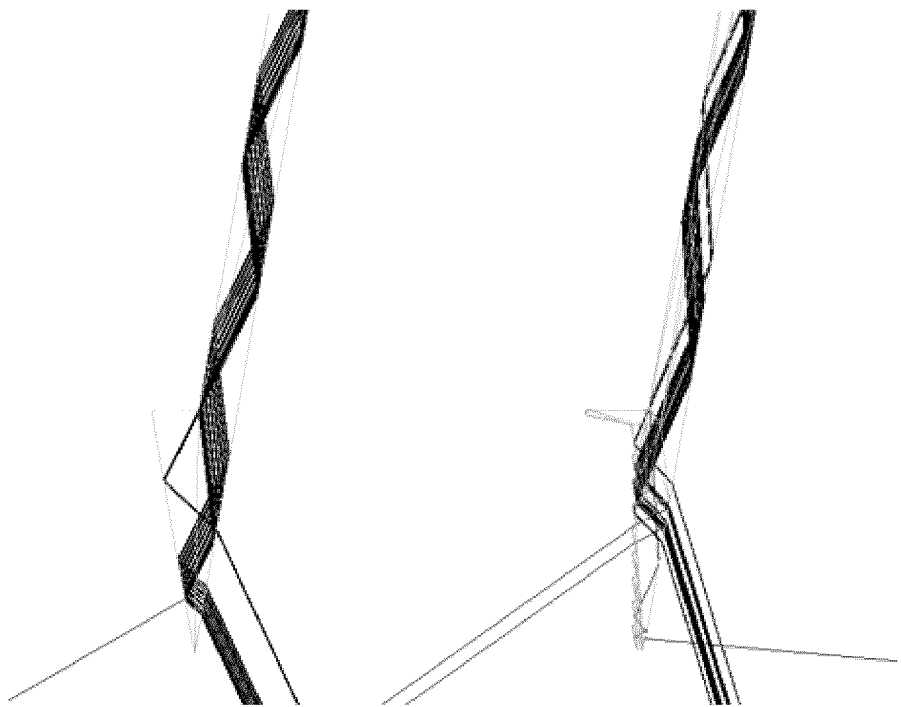
FIGS. 29A to 29E show cross-sectional views of a path of an exemplary light ray internally reflected in each of the FIG. 1 (left) and FIG. 26 (right) light guides and then refracting out of the light guides at the left and right sides of each figure respectively, wherein the light ray enters the light guide at an incident angle of 10, 20, 30, 40 and 50 degrees respectively.
Figure 29B:
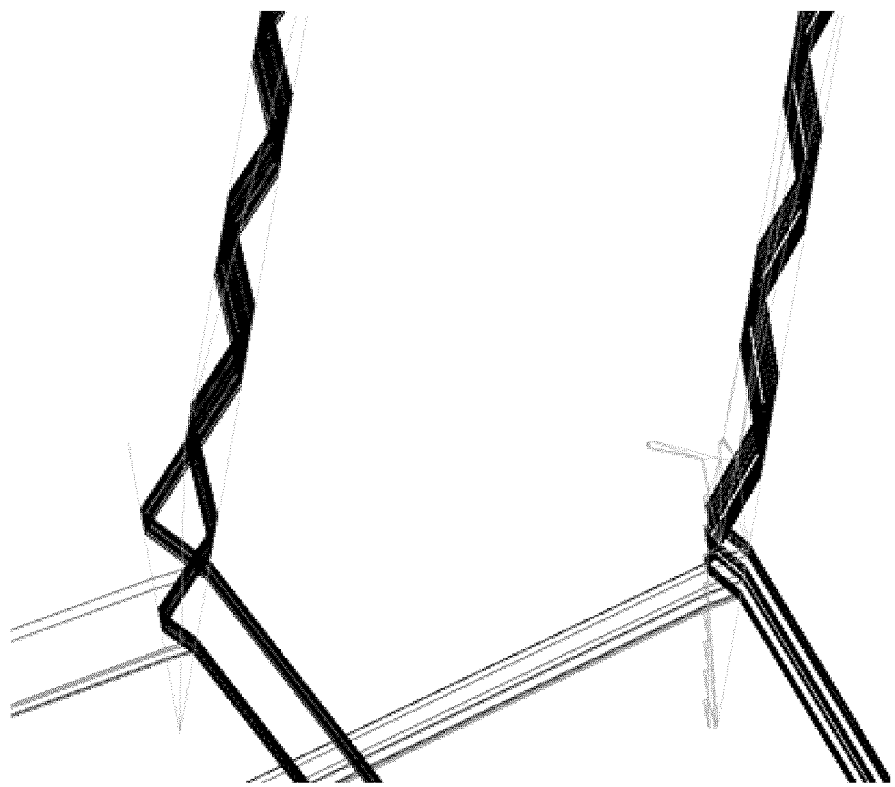
Figure 29C:
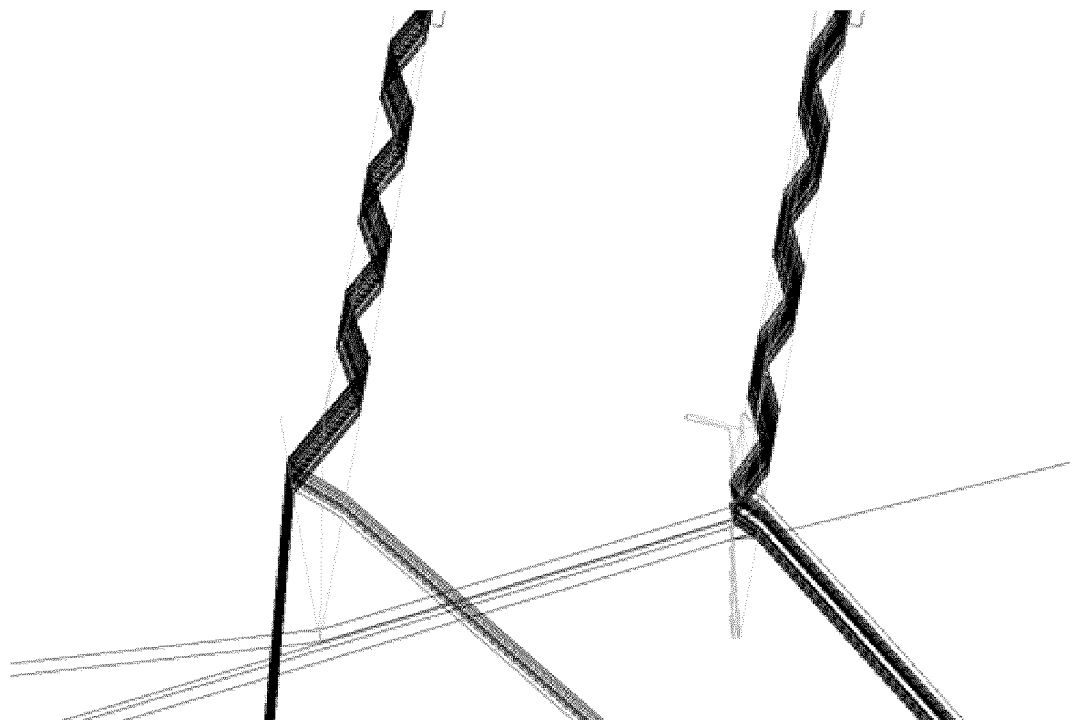
Figure 29D:
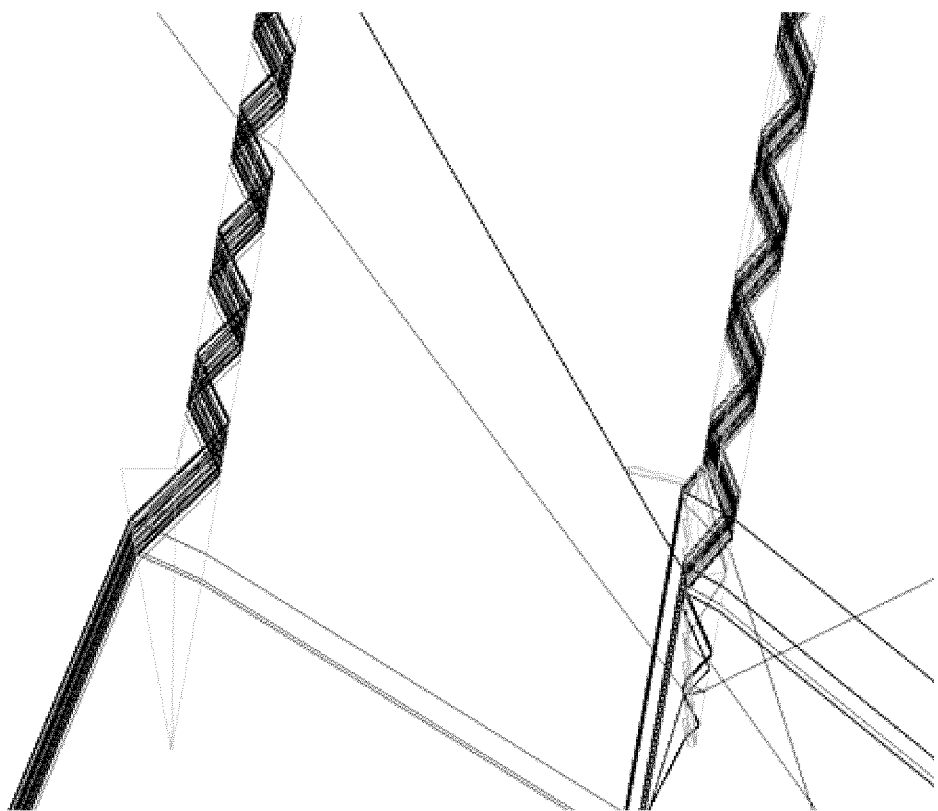
Figure 29E:
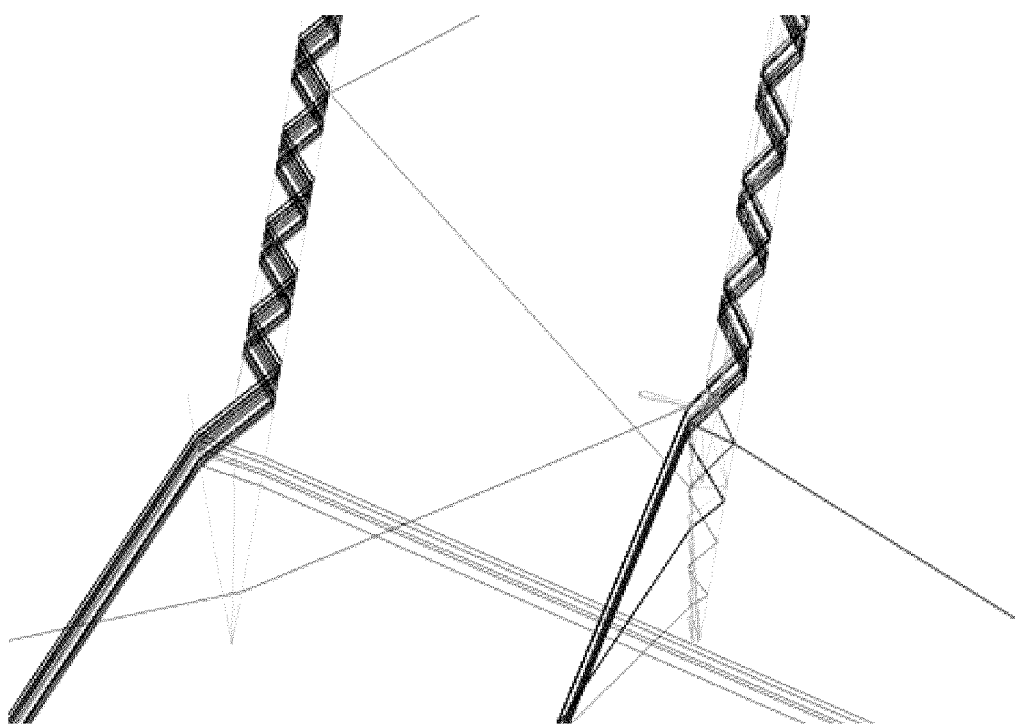

FIGS. 27A and 27B are cross sectional views of exemplary paths of light rays internally reflecting within and then refracting out of light emission regions 16, 716 of light guide 10 and light guide 700, respectively. As compared to the light refracted out of light guide 10 (shown in FIG. 27A), light refracts out of light guide 700 at points PF and PS higher up along the light guide, i.e., having shorter lengths LP (as best shown in FIG. 27B). Steps 750 along major first surface 718 and/or major second surface 722 of light guide 700 reduce the average distance (DF-S) between first and second major surfaces 718, 722 along the lengths thereof, i.e., the average width of light emission region 716 is smaller than a smooth, non-stepped light emission region. The reduced average distance (DF-S) between first and second major surfaces 718, 722 allows more reflections between the surfaces 718, 722 as the light travels within light emission region 716. By contrast, the greater average distance (DF-S) between the smooth first and second major surfaces 18, 22 of light guide 10 causes light to travel longer and further down within light emission region 16 (i.e., resulting in longer lengths LP) before light hits and reflects off the surfaces 18, 22 and then refracts out of light guide 10. Thus a stepped light emission region 716 allows light to refract out of light emission region 716 earlier and higher up along light guide 700. Releasing light higher up light guide 700 advantageously prevents or reduces striping of light resulting in an even light distribution and increased luminous area. This is best shown in the FIG. 28 plots, showing the difference in the distribution of illuminance of the extraction area from using light guide 10 (FIGS. 28A and 28B) and light guide 700 (FIGS. 28C and 28D).

In some embodiments, a maximum thickness 738 of light emission region 716 may be at least 1.5 times, or 2 times, a maximum thickness 740 of light transmission region 714. In some embodiments, a maximum thickness 38 of the FIG. 1 light emission region 16 is the same as the maximum thickness 738 of the FIG. 26 light emission region 716. In some embodiments, an average thickness along a length of the FIG. 1 light emission region 16 is about 20% to about 50% greater than an average thickness along a length of the FIG. 26 light emission region 716.

FIGS. 29A to 29E (collectively, FIG. 29) show exemplary simulated ray traces of light emitted from light guide 10 or light guide 700 of a single ray reaction, where the ray enters either light guide 10 (left) or light guide 700 (right) from various angles, from 10, 20, 30, 40 or 50 degrees respectively. In each reaction, light hits the first major surface (18, 718) and then exits out of both first major surface 18, 718 and second major surface 22, 722 of light emission region 16, 716 at desirable angles. The FIG. 29 simulated ray traces show that at each angle at which the ray enters the respective light guides, the angles at which light refracts out of light emission region 16, 716 of light guide 10 and light guide 700 are substantially identical. FIG. 29 shows that each angle at which the ray enters the respective light guides, light from light guide 700 (right) is emitted higher up along light guide 700 compared to light emitted from light guide 10 (left). Light emitted from light guide 700 (right) is also more evenly distributed compared to light emitted from light guide 10 (left).

Figure 30:
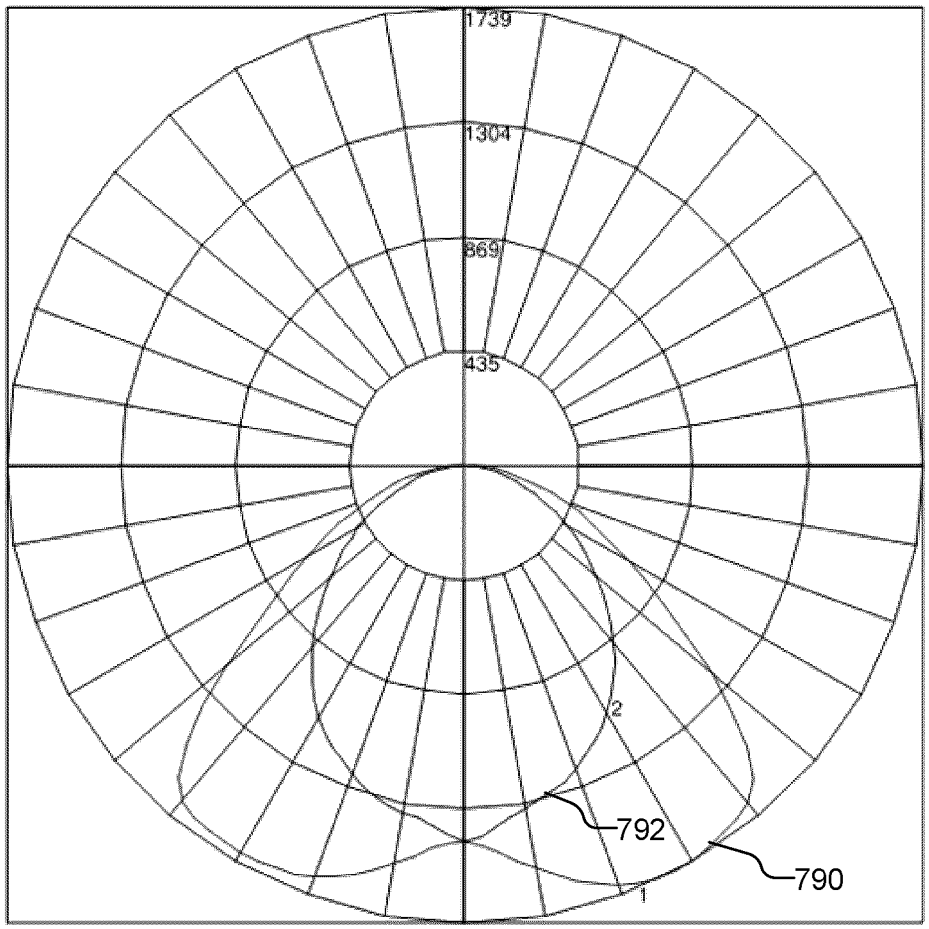
FIG. 30 is an optical distribution for the luminaire assembly of FIG. 32A (below) at 0 and 90 degree azimuthal angle.
Figure 31A:
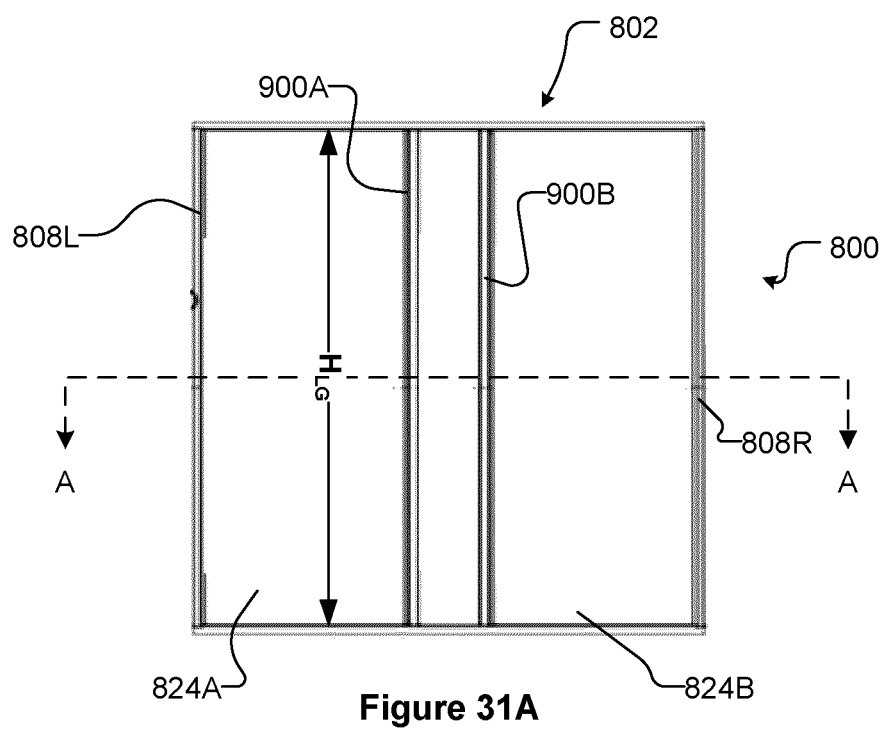
FIG. 31A is a bottom view of a luminaire assembly according to an embodiment of the invention.

FIG. 30 is an optical distribution for the luminaire assembly of FIG. 32A (below) at 0 and 90 degree azimuthal angle. The batwing distribution 790 (the outer line) occurs at the 90 degree azimuthal angle which is perpendicular to the longitudinal axis of a light guide 900A or a light guide 900B as shown in FIG. 31A. The Lambertian distribution 792 (the inner line) occurs on the axis which runs parallel to the longitudinal axis of the light guide 900A or the light guide 900B as shown in FIG. 31A.

Figure 31B:
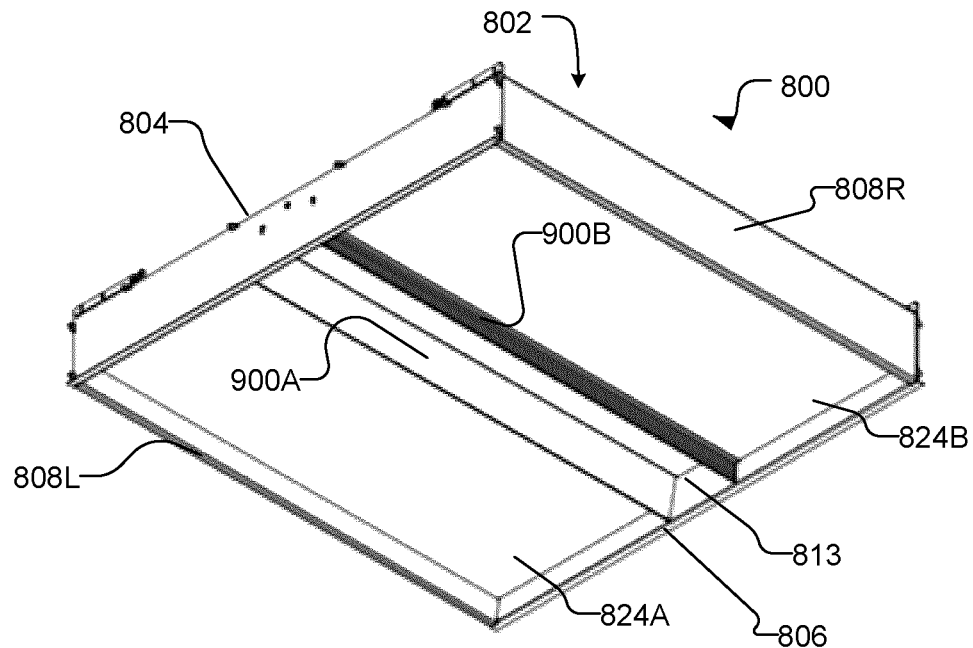
FIG. 31B is an isometric bottom view of the FIG. 31A luminaire assembly.

FIGS. 31A and 31B are respective bottom view and an isometric bottom view showing a housing 802 of a luminaire assembly 800 according to an example embodiment. FIG. 32A is a cross sectional view of luminaire assembly 800 taken along line A-A of FIG. 31A. FIGS. 31A and 31B show a planar and rectangular housing 802. This is not mandatory, however. Housing 802 may be any suitable shape.

Figures 32A, 32B, 32C:
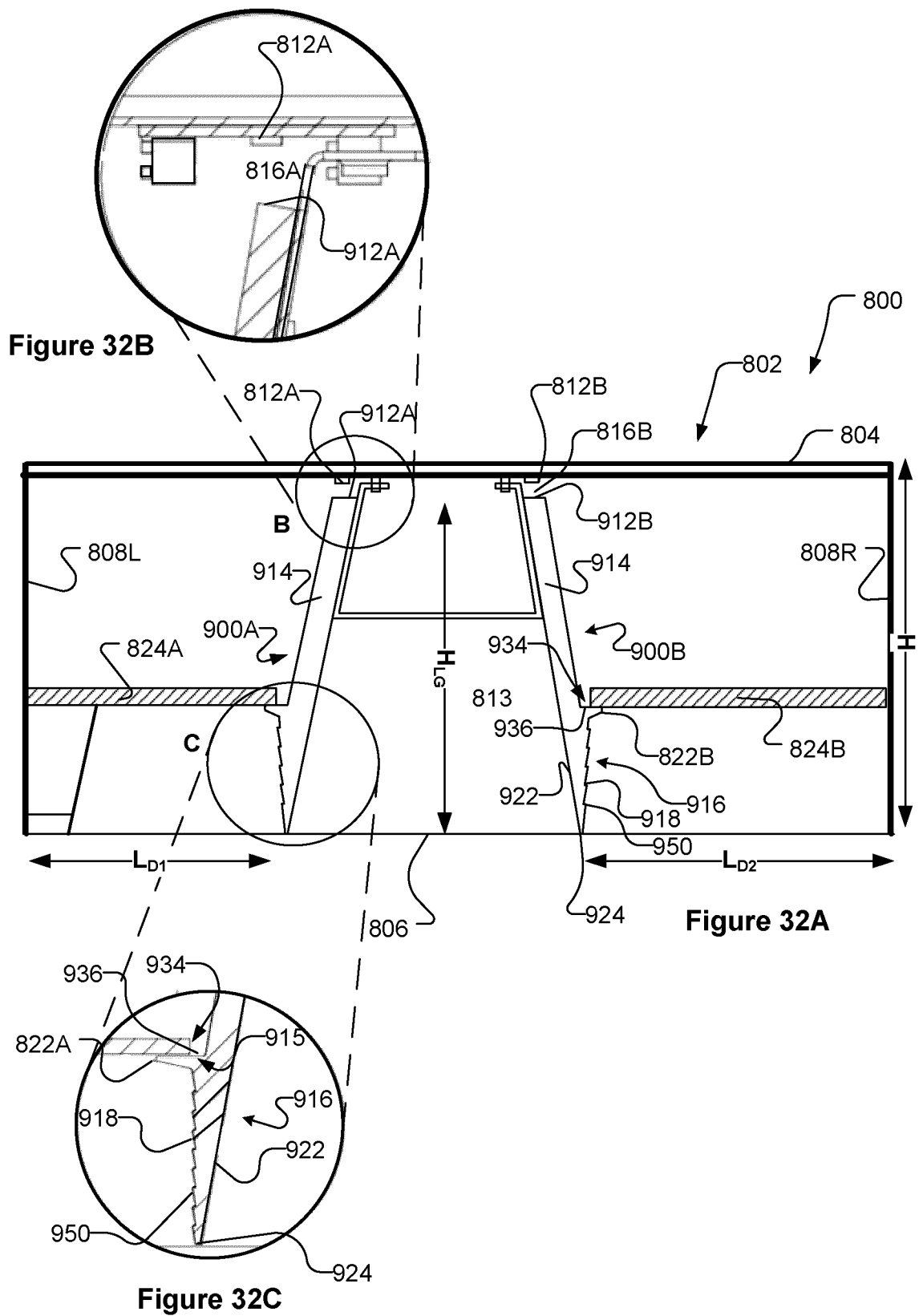
FIG. 32A is a cross sectional view of the FIG. 31A luminaire assembly taken along line A-A.
FIG. 32B is an enlarged partial view of the area indicated by the circle marked with the letter "B" in FIG. 32A.
FIG. 32C is an enlarged partial view of the area indicated by the circle marked with the letter "C" in FIG. 32A.

With reference to FIGS. 31A, 31B and 32A, housing 802 has an upper side 804, a bottom side 806 and left and right sides 808L, 808R. Housing 802 may include one or more light guides 900. In an example embodiment, two light guides 900A, 900B are provided. Light guides 900A, 900B (collectively light guides 900) may be vertically disposed along a height (H) between top and bottom sides 804, 806 within housing 802. Light guides 900A, 900B may or may not extend a height of housing 802. A distal end 924 of light guide 900 may be in contact with bottom side 806 of housing 802. Light guides 900A, 900B may be in mirrored configurations.

A cavity 813 may be defined between light guides 900A, 900B. Luminaire assembly 800 may also include one or more light sources 812. Luminaire assembly 800 may also include one or more diffusers 824. In an example embodiments, two light sources 812A, 812B (collectively, light sources 812) and diffusers 824A, 824B (collectively, diffusers 824) are provided.

With reference to FIGS. 32B and 32C, each light guide 900 may include a light receiving surface 912 (e.g., light receiving surfaces 912A, 912B), light transmission region 914, a transition region 934, and a light emission region 916. Light emission region 916 may have a first major surface 918 and an opposing second major surface 922. In some embodiments, first major surface 918 may face away from cavity 813 and second major surface 922 may face toward cavity 813. In some embodiments, first major surface 918 may face toward cavity 813 and second major surface 922 may face away from cavity 813. In embodiments in which a plurality of light guides 900 are provided, each light guide 900 may be oriented in a different direction with respect to each other, e.g., a first light guide 900 may have a first major surface 918 that faces toward cavity 813 and a second light guide 920 may have a first major surface 918 that faces away from cavity 813.

In some embodiments, first major surface 918 includes a plurality of steps 950 extending a length thereof. In an example embodiment, second major surface 922 is smooth. In some embodiments, second major surface 922 includes a plurality of steps 950 extending a length thereof. In some embodiments, one or both first major surface 918 and second major surface 922 include a plurality of flutes (not shown).

In some embodiments, each light guide 900 optionally includes a lip 822. In an example embodiment, each light guide 900A and 900B has a lip 822A, 822B respectively which each projects outwardly from transition region 934 to support a respective diffuser 824A, 824B in place. In some embodiments, lip 822 is projected outwardly from the same side as first major surface 418. In such embodiments, a return surface 936 may be continuous with lip 822, which may be continuous with first major surface 918. Lip 822 may project outwardly from the same side as second major surface 922. Lip 822 is not mandatory. Diffusers 824 may be supported within housing 802 by other suitable means.

Diffusers 824 may be configured to diffuse or distribute light emanated from light sources 812. Any suitable diffuser may be used, such as opal or sandblasted diffusers made of acrylic or polycarbonate material. Diffusers 824 may be substantially planar. Diffusers 824 may have a thickness in a range of about 3 mm to about 9 mm. Diffusers 824 may be any suitable shape. The shape of diffusers 824 may depend on the shape of housing 802. In some embodiments, each diffuser 824 extends at least part-way across a length of housing 802. In an example embodiment, each diffuser 824 has a length in a range of about 6 to 48 inches. In an example embodiment, each diffuser 824A, 824B extends along a length (LD1, LD2) of housing 802 from lip 832A, 832B of light guide 900A, 900B to the respective left and right side 808L, 808R of housing 802. In such embodiments, the ends of diffusers 824A, 824B may be in contact with the respective left and right side 808L, 808R of housing 802. Diffusers 824A, 824B may or may not have the same length and/or thickness.

Light sources 812 may be a light emitting diode (LED) or an array of LEDs. In some embodiments, light sources 812 may be any other point source emitter of light, including laser diodes for example. In some embodiments, light sources 812 may be disposed on top side 804. In some embodiments, each light source 812 is in contact with a light receiving surface 912 of light guide 900.

In some embodiments, light source 812 squarely faces a light receiving surface 912 of light guide 900. In such embodiments, a parallel ray of light enters light guides 900 through light receiving surfaces 912. In an example embodiment, as shown in FIG. 32B, a plurality of light sources 812A and 812B are provided. Light source 812A is positioned at an angle relative to light receiving surface 912A. In such embodiments, light enters light guide 900A through light receiving surface 912A at angles between about 30 degrees to about 80 degrees.

In some embodiments, light source 812 is spaced apart from a light receiving surface 912 of light guide 900. A distance between light source 812 and light receiving surface 912 may be about 0 cm to about 12 cm. In an example embodiment, an air gap 816 (e.g., air gap 816A, 816B) may be defined between its respective light source 812A, 812B and light receiving surface 912A, 912B (as best shown in FIG. 32B).

Figure 33:
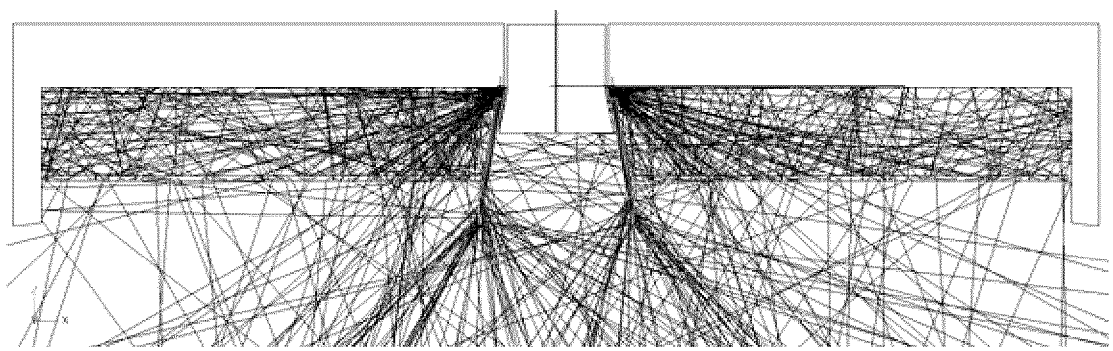
FIG. 33 is a cross sectional view of paths of exemplary light rays internally reflecting within a diffuser and a light guide and refracting out of the diffuser and the light guide of the embodiment shown in FIG. 31A.

Air gap 816 may be provided to allow a first portion of the light emanated from light sources 812 to enter and travel through light guides 900 to refract out of light emission regions 916. A second portion of the light emanated from light sources 812 enter and refract out of diffusers 824. In some embodiments, light guides 900 emit light with a substantially batwing distribution. In some embodiments, diffusers 824 emit light with a substantially Lambertian distribution. This is illustrated in the exemplary view of paths of exemplary light rays internally reflecting within diffusers 824 and light guides 900 and refracting out of diffusers 824 and light guides 800 in FIG. 33.

Figure 34:
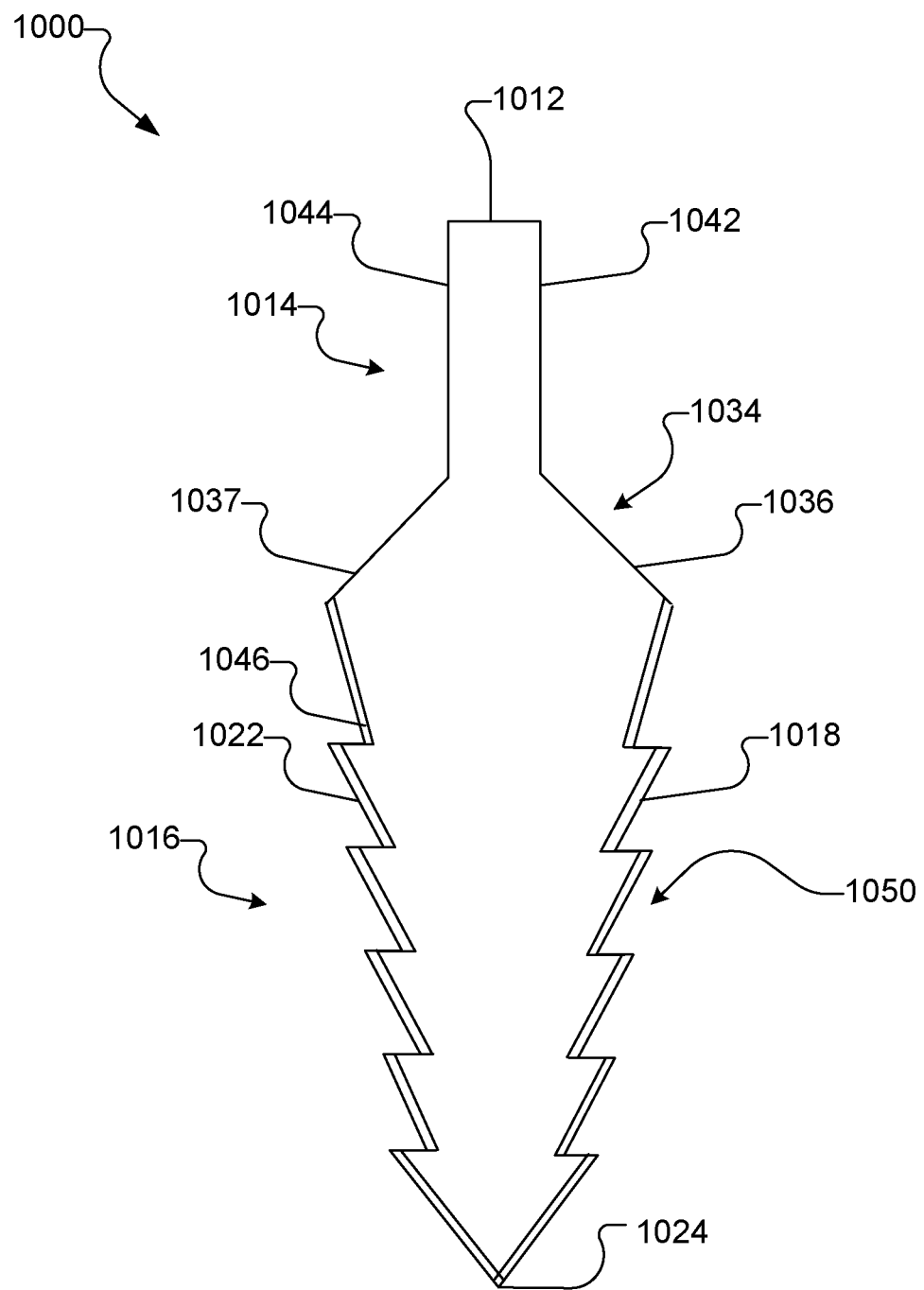
FIG. 34 is cross sectional view of a light guide according to another embodiment.

FIG. 34 is a light guide 1000 according to another embodiment. Light guide 1000 may have a cross-sectional shape similar to that of light guide 400 (FIG. 19). Light guide 1000 is similar to light guide 400 except that first and second major surfaces 1018, 1022 of light emission region 1016 may define a plurality of steps 1050 extending along the lengths thereof. In the illustrated embodiment, first and second major surfaces 1018, 1022 both define a plurality of steps 1050. In some embodiments, either one of first major surface 1018 or second major surface 1022 defines a plurality of steps 1050. Steps 1050 are similar to steps 750 of light guide 700 as detailed above. A plurality of flutes 1046 may be provided on one or both of first and second major surfaces 1018, 1022.

First and second major surfaces 1018, 1022 of light guide 1000 taper towards each other to define a distal end 1024. Distal end 1024 may be a point in cross section as shown in the illustrated embodiment but this is not mandatory. In some embodiments distal end 1024 may be blunt or flat.

Figure 35:
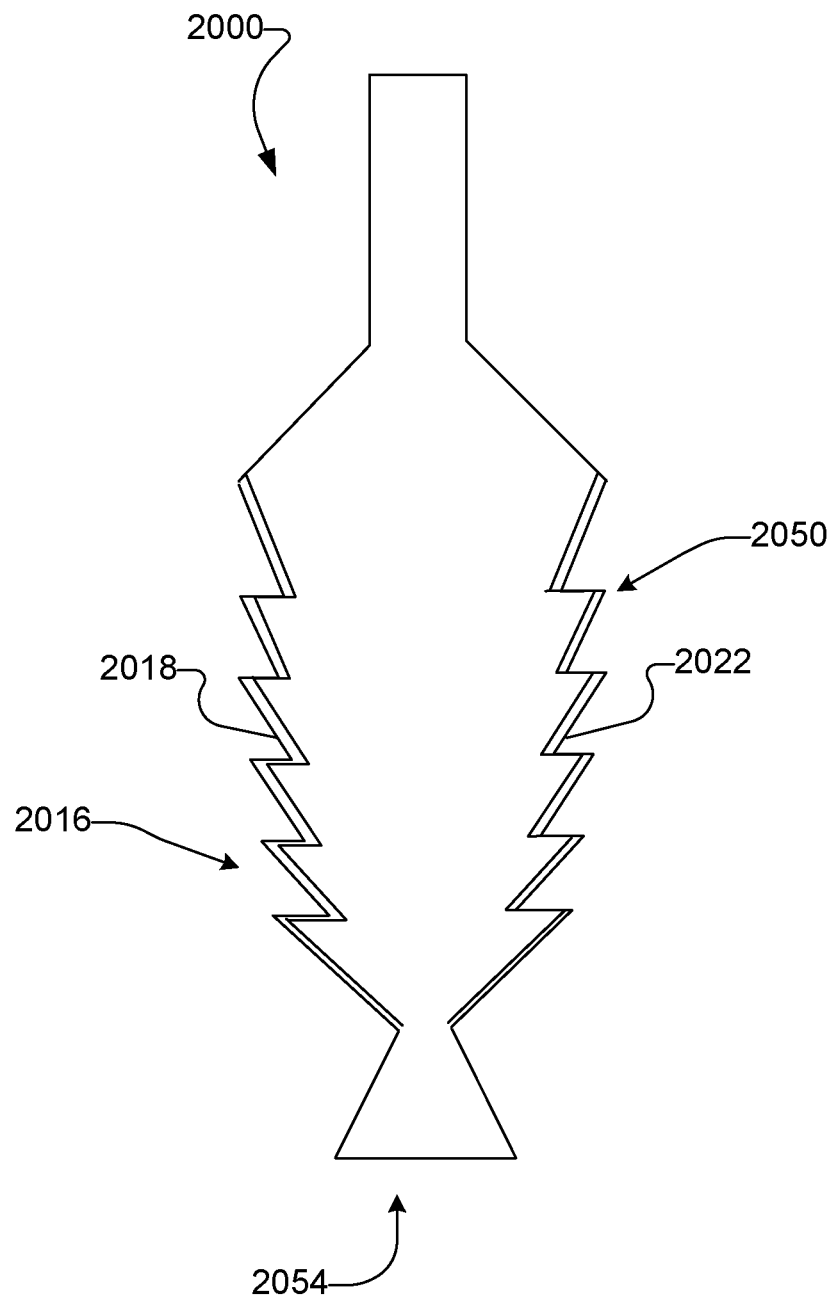
FIG. 35 is cross sectional view of a light guide according to another embodiment.

FIG. 35 shows a light guide 2000 according to another embodiment. Light guide 2000 has an inverted V-shape. Light guide 2000 is similar to light guide 500 (FIG. 23) except that first major surface 2018 and/or second major surface 2022 of light emission region 2016 may define a plurality of steps 2050 extending along its lengths thereof, in the same manner that light guide 1000 is similar to light guide 700.

Where a component is referred to above, unless otherwise indicated, reference to that component (including a reference to a "means") should be interpreted as including as equivalents of that component any component which performs the function of the described component (i.e. that is functionally equivalent), including components which are not structurally equivalent to the disclosed structure which performs the function in the illustrated exemplary embodiments of the invention.

This application is intended to cover any variations, uses, or adaptations of the invention using its general principles. Further, this application is intended to cover such departures from the present disclosure as come within known or customary practice in the art to which this invention pertains and which fall within the limits of the appended claims. Accordingly, the scope of the claims should not be limited by the preferred embodiments set forth in the description, but should be given the broadest interpretation consistent with the description as a whole.

The invention claimed is:

1. A light guide comprising:
a light receiving surface;
a light transmission region in optical communication with the light receiving surface;
a light emission region comprising a wedge shape cross section, the light emission region in optical communication with the light transmission region, the light emission region comprising:
a first major surface comprising a plurality of vertically extending flutes;
a second major surface;
wherein the first major surface and the second major surface taper toward each other to define a distal end; and
whereby substantially all light received at the light receiving surface internally reflects through the light transmission region before entering the light emission region,
wherein the light transmission region comprises a non-straight path between the light receiving surface and the light emission region, the non-straight path comprising a curved portion;
wherein an arc length of a second major surface of the light transmission region corresponds to an arc measure of less than 90 degrees, or less than 80 degrees, a height of the light emission region is from 80% to 120% of a height of the light transmission region, wherein the plurality of vertically extending flutes of the light emission region extend into at least a portion of the light transmission region, and wherein the light receiving surface is in a substantially vertical plane.

2. The light guide as defined in claim 1 wherein, at the distal end, a first inner angle defined by the first major surface relative to an imaginary vertical line, and a second inner angle defined by the second major surface relative to the imaginary vertical line, each range from 2 degrees to 15 degrees.

3. The light guide as defined in claim 2 wherein the first inner angle and the second inner angle are substantially the same.

4. The light guide as defined in claim 1 wherein, at the distal end, an inner angle defined between the first major surface and the second major surface ranges from 4 degrees to 30 degrees, and wherein the second major surface is substantially vertical.

5. The light guide as defined claim 1 further comprising a transition region between the light transmission region and the light emission region, defined by a first return surface between the first major surface of the light emission region and a first major surface of the light transmission region.

6. The light guide as defined in claim 5 wherein a maximum thickness of the light emission region is at least 1.5 times a maximum thickness of the light transmission region.

7. The light guide as defined in claim 1 wherein the distal end comprises a point, the second major surface is smooth, further comprises a substantially straight path between the light receiving surface and the distal end, and wherein the light receiving surface is in a substantially horizontal plane.

8. The light guide as defined claim 1 wherein the light emission region is a closed shape comprising a circle, an ellipse or a polygon, or an open shape that is straight, bent or curved.

9. The light guide as defined in claim 1 wherein one or both of the first and second major surfaces comprise a plurality of steps disposed along a length thereof, wherein the plurality of steps each comprises a first surface and a second surface, the first and second surfaces defining an angle therebetween, wherein the angle is between about 75 degrees and about 110 degrees, or about 90 degrees.

10. A light guide comprising:
a light receiving surface;
a light transmission region in optical communication with the light receiving surface;
a light emission region comprising a wedge shape cross section, the light emission region in optical communication with the light transmission region, the light emission region comprising:
a first major surface comprising a plurality of vertically extending flutes;
a second major surface;
wherein the first major surface and the second major surface taper toward each other to define a distal end; and
whereby substantially all light received at the light receiving surface internally reflects through the light transmission region before entering the light emission region wherein the second major surface comprises a plurality of vertically extending flutes, wherein a transition region is further defined by a second return surface between the second major surface of the light emission region and the second major surface of the light transmission region, further comprising a substantially straight path between the light receiving surface and the distal end, wherein the distal end comprises a point or an inverted V-shape.

11. A light guide comprising:
a light receiving surface;
a light transmission region in optical communication with the light receiving surface;
a light emission region comprising a wedge shape cross section, the light emission region in optical communication with the light transmission region, the light emission region comprising:
a first major surface comprising a plurality of vertically extending flutes;
a second major surface;
wherein the first major surface and the second major surface taper toward each other to define a distal end; and
whereby substantially all light received at the light receiving surface internally reflects through the transmission region before entering the emission region; wherein a first return angle or a second return angle is defined by a respectively first return surface or a second return surface and an imaginary line, the first return angle and the second return angle may be in a range from about 0 degrees to about 45 degrees.

12. The luminaire assembly as defined in claim 11 wherein the at least one light guide further comprises a lip projecting outwardly from the first major surface for supporting an edge of the diffuser, wherein the light source is spaced apart from the light receiving surface to define an air gap, wherein the light source is positioned at an angle relative to the light receiving surface.

13. A luminaire assembly comprising:
a housing having opposing first and second sides and opposing third and fourth sides;
at least one light guide comprising:
a light receiving surface;
a light transmission region in optical communication with the light receiving surface;
a light emission region comprising a wedge shape cross section, the light emission region in optical communication with the light transmission region, the light emission region comprising:
a first major surface comprising a plurality of vertically extending flutes;
a second major surface;
wherein the first major surface and the second major surface taper toward each other to define a distal end; and
whereby substantially all light received at the light receiving surface internally reflects through the transmission region before entering the emission region
a light source on the first side of the housing and facing a light receiving surface of the at least one light guide; and
a diffuser extending at least part-way across a length of the housing, and wherein the at least one light guide includes a first light guide and an opposing second light guide, the first and second light guides vertically disposed within the housing and defining a cavity therebetween, wherein the first and second light guides are in mirrored configurations, wherein the first major surface of the first and second light guide faces away from the cavity and the second major surface of the first and second light guide faces towards the cavity.

14. A luminaire assembly comprising:
a housing having opposing first and second sides and opposing third and fourth sides;
at least one light guide within the housing, the at least one light guide comprising:
a light receiving surface;
a first major surface; and
a second major surface opposite to the first major surface, the first and second major surfaces taper toward each other to define a distal end;
a light source on the first side of the housing and facing the light receiving surface; and
a diffuser extending at least part-way across a length of the housing further comprising a first light guide and an opposing second light guide, the first and second light guides vertically disposed within the housing and defining a cavity therebetween, wherein the first and second light guides are in mirrored configurations, and wherein the first major surface faces away from the cavity and the second major surface faces towards the cavity.

15. The luminaire assembly as defined in claim 9 wherein one or both of the first major surface and/or the second major surface comprise a plurality of steps disposed along its length.

16. The luminaire assembly as defined in claim 9 wherein one or both of the first major surface and/or the second major surface comprise a plurality of flutes extending along its length.

17. The luminaire assembly as defined in claim 14 wherein one or both of the first major surface and/or the second major surface is smooth.

18. The luminaire assembly as defined in claim 14 wherein the at least one light guide further comprises a lip projecting outwardly from the first major surface for supporting an edge of the diffuser, wherein the light source is spaced apart from the light receiving surface to define an air gap, and wherein the light source is positioned at an angle relative to the light receiving surface.

* * * * *